(12) United States Patent
Kanamoto et al.

(10) Patent No.: US 11,662,961 B2
(45) Date of Patent: May 30, 2023

(54) INFORMATION PROCESSING APPARATUS AND CONTROL METHOD THEREFOR

(71) Applicant: CANON KABUSHIKI KAISHA, Tokyo (JP)

(72) Inventors: Yoshiji Kanamoto, Tokyo (JP); Toshihiko Iida, Ibaraki (JP); Kimio Hayashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/665,052

(22) Filed: Feb. 4, 2022

(65) Prior Publication Data

US 2022/0156019 A1    May 19, 2022

Related U.S. Application Data

(63) Continuation of application No. PCT/JP2020/026955, filed on Jul. 10, 2020.

(30) Foreign Application Priority Data

Aug. 7, 2019   (JP) .............................. JP2019-145570

(51) Int. Cl.
*G06F 3/12*    (2006.01)

(52) U.S. Cl.
CPC .......... *G06F 3/1208* (2013.01); *G06F 3/1251* (2013.01)

(58) Field of Classification Search
CPC ............................ G06F 3/1208; G06F 3/1251
USPC ....................................................... 358/1.14
See application file for complete search history.

(56) References Cited

U.S. PATENT DOCUMENTS

| | | | |
|---|---|---|---|
| 2009/0138878 A1* | 5/2009 | Fernstrom ............. | G06F 1/3284 718/102 |
| 2015/0077800 A1* | 3/2015 | Yamagishi ............. | G06Q 50/04 358/1.15 |
| 2020/0019353 A1* | 1/2020 | Okajima ............... | G06F 3/1257 |

FOREIGN PATENT DOCUMENTS

| JP | 2015147338 A | 8/2015 |
|---|---|---|
| JP | 2016010948 A | 1/2016 |
| JP | 2016055525 A | 4/2016 |
| JP | 2016118446 A | 6/2016 |
| JP | 2018136382 A | 8/2018 |

* cited by examiner

*Primary Examiner* — Allen H Nguyen
(74) *Attorney, Agent, or Firm* — Canon U.S.A., Inc. IP Division

(57) ABSTRACT

Delivery form information on a print product is acquired, position information indicating a position of quality inspection on the print product is generated in accordance with the acquired delivery form information, and quality report data including the position information is generated.

12 Claims, 26 Drawing Sheets

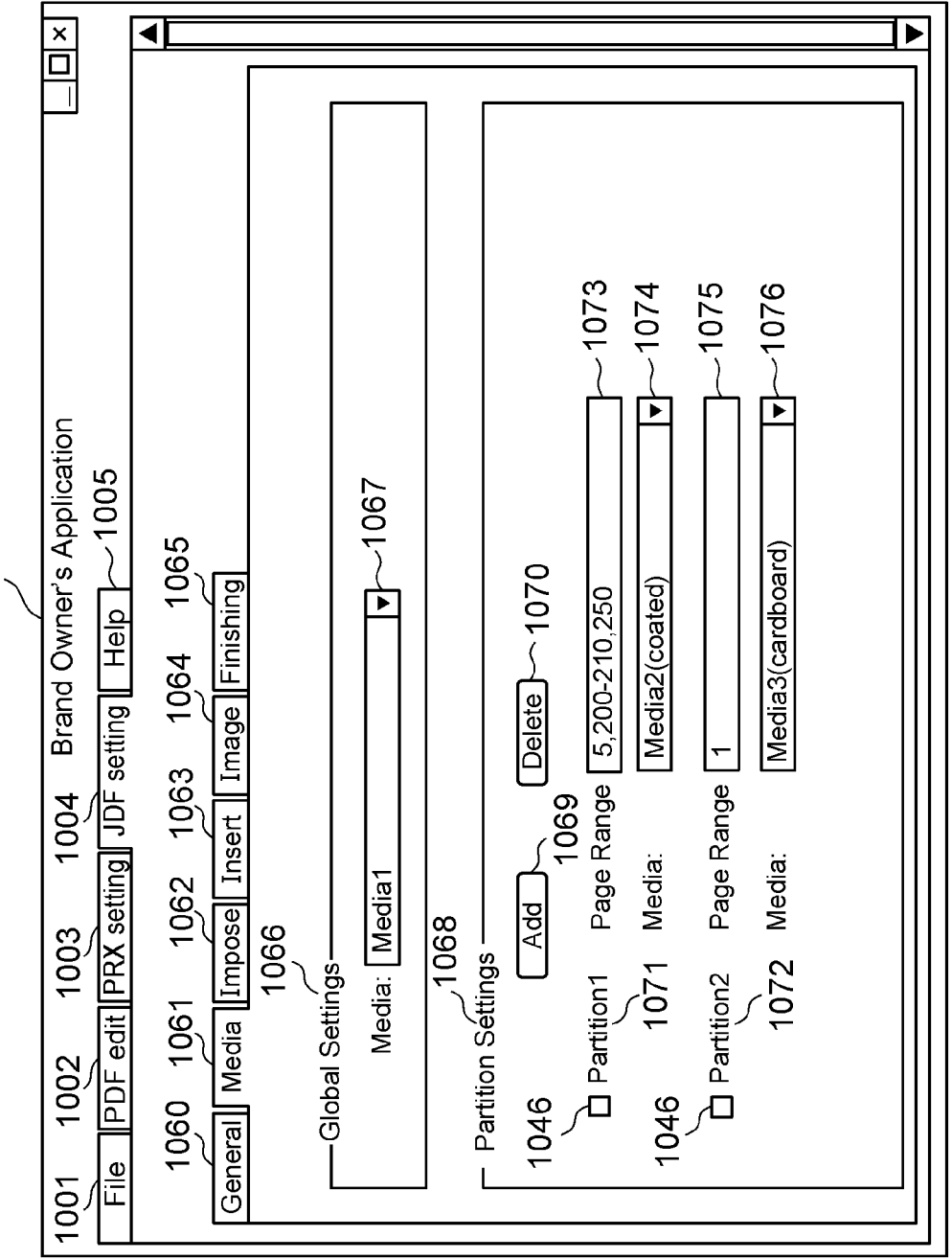

FIG. 12A

```
<?xml version="1.0" encoding="UTF-8"?>
<JDF ID="ID01" JobPart ID="JobPartID01" Type="Combined"
    Types="LayoutPreparation Imposition Interpreting Rendering DigitalPrinting"
    Activation="Active" Status="Ready" Version="1.3" Category="DigitalPrinting"
    ICSVersions="IDP_L1-1.0 Base_L1-1.0" MaxVersion="1.3"
    xmlns="http://www.CIP4.org/JDFSchema_1_1"
    xmlns:cj="http://www.canon.com/ns/CanonJDF"
    JobID="JobID01" DescriptiveName="ProductAAA">

<ResourcePool>

<RunList Class="Parameter" ID="IDRL" Status="Available" PartIDKeys="Run">
            <RunList Run="0">
                <LayoutElement>
                    <FileSpec MimeType="application/pdf" URL="cid:Sample" TotalPage="250"/>
                </LayoutElement>
            </RunList>                                                         1201
        </RunList>
1202 ── <DigitalPrintingParams Class="Parameter" ID="IDDPP" Status="Available"
            Collate="SheetSetAndJob" PartIDKeys="RunIndex" Amount="2000000" Lot="1000">
            <MediaRef rRef="MED_000"/>
                                     1204                      1203     1287
1206 ──     <DigitalPrintingParams RunIndex="4 199~209 249">
                <MediaRef rRef="Med_001"/>
            </DigitalPrintingParams>    1207  1205
1208 ──     <DigitalPrintingParams RunIndex="0">
                <MediaRef rRef="Med_002"/>
            </DigitalPrintingParams>    1209
                                    1210
                                                                        1212
        </DigitalPrintingParams>
1211 ── <Media ID="MED_000" Class="Consumable" Status="Available" Dimension="842 1191"
            DesciptiveName="Media1"/> ── 1213                               1215
1214 ── <Media ID="MED_001" Class="Consumable" Status="Available" Dimension="842 1191"
            DescriptiveName="Media2(coated)"/> ── 1216
1217 ── <Media ID="MED_002" Class="Consumable" Status="Available" Dimension="842 1191"
            DescriptiveName="Media3(cardboard)"/>
                                                                            1218
    </ResourcePool>                 1219
    <ResourceLinkPool>

</ResourceLinkPool>
</JDF>
```

FIG. 12B

```xml
<?xml version="1.0" encoding="UTF-8"?>
<PRX xmlns:prx="http://xxx.org/prx" xmlns:cc="http://yyy.com/CxF" xmlns="http://zzz.org/prx"
  xmlns:xsi="http://www.w3.org/2001/XMLSchema-instance"
  xsi:schemaLocation="http://xxx.yyy.zzz.org/prx PRX.xsd">

<PRXInfo><PRXDate>2019-03-27</PRXDate><PRXId>xxx</PRXId></PRXInfo>                                    ⎫
  <BuyerInfo><CompanyName>ABC Ltd.</CompanyName><Location>xxx</Location></BuyerInfo>                   ⎬—1220
  <GradingInfo>—1221
    <Grade DisplayLabel="Excellent" Rank="10"><ValueRange>
       <LogicalOperator>GT</LogicalOperator><CalculatedValue>8</CalculatedValue>
    </ValueRange></Grade>
    <Grade DisplayLabel="Good" Rank="8"><ValueRange>
       <LogicalOperator>GT</LogicalOperator><CalculatedValue>7</CalculatedValue>
    </ValueRange></Grade>
    <Grade DisplayLabel="Acceptable" Rank="7"><ValueRange>
       <LogicalOperator>GT</LogicalOperator><CalculatedValue>6.5</CalculatedValue>
    </ValueRange></Grade>
    <Grade DisplayLabel="Poor" Rank=""><ValueRange>
       <LogicalOperator>LT</LogicalOperator><CalculatedValue>6.5</CalculatedValue>
    </ValueRange></Grade>
    <Formula>lambda(bc cs rg)(bc*(cs+rg*4)/5))</Formula>
    <MinimumAcceptableRank>8</MinimumAcceptableRank>—1227
    <DesiredRank>9</DesiredRank>—1228
  </GradingInfo>

<QualityGoals>
    <ColorScore>
       <ColorScoringScale>                       1232
          <UoM>dE</UoM>
          <CxFReference>CXF1</CxFReference>
          <ParameterScore DisplayLabel="Excellent" Rank="10"><ValueRange>
             <LogicalOperator>LT</LogicalOperator><CalculatedValue>1.0</CalculatedValue>
          </ValueRange></ParameterScore>
          <ParameterScore DisplayLabel="Good" Rank="9"><ValueRange>
             <LogicalOperator>LT</LogicalOperator><CalculatedValue>2.0</CalculatedValue>
          </ValueRange></ParameterScore>
          <ParameterScore DisplayLabel="Acceptable" Rank="8"><ValueRange>
             <LogicalOperator>LT</LogicalOperator><CalculatedValue>4.0</CalculatedValue>
          </ValueRange></ParameterScore>
          <ParameterScore DisplayLabel="Poor" Rank=""><ValueRange>
             <LogicalOperator>GT</LogicalOperator><CalculatedValue>4.0</CalculatedValue>
          </ValueRange></ParameterScore>
       </ColorScoringScale>
       <MinimumAcceptableRank>8</MinimumAcceptableRank>—1237
       <DesiredRank>10</DesiredRank>
       <CalculationVariable>cs</CalculationVariable>—1239
       <SamplingPositionMatrix><UoM>mm</UoM><XPosition>12.34</Xposition><YPosition>5.23</Yposition>
       </SamplingPositionMatrix>
    </ColorScore>           1241
    <Registration>
       <UoM>mm</UoM>
       <ScoringInfo>
          <ParameterScore DisplayLabel="Excellent" Rank="10"><ValueRange>
             <LogicalOperator>LT</LogicalOperator><CalculatedValue>0.002</CalculatedValue>
          </ValueRange><ParameterScore>
          <ParameterScore DisplayLabel="Acceptable" Rank="5"><ValueRange>
             <LogicalOperator>LT</LogicalOperator><CalculatedValue>0.005</CalculatedValue>
          </ValueRange><ParameterScore>
          <ParameterScore DisplayLabel="Poor" Rank=""><ValueRange>
             <LogicalOperator>GT</LogicalOperator><CalculatedValue>0.005</CalculatedValue>
          </ValueRange><ParameterScore>
       </ScoringInfo>
       <MinimumAcceptableRank>5</MinimumAcceptableRank>—1246
       <DesiredRank>10</DesiredRank>      1248
       <CalculationVariable>rg</CalculationVariable>
       <SamplingPositionMatrix><UoM>mm</UoM><XPosition>3.00</Xposition><YPosition>3.00</Yposition>
       </SamplingPositionMatrix>
    </Registration>    1250
    <Barcode>
       <BarcodeScore>
          <BarcodeScoringScale DisplayLabel="pass" Rank="1"><Value>1</Value></BarcodeScoringScale>
          <BarcodeScoringScale DisplayLabel="fail" Rank="0"><Value>0</Value></BarcodeScoringScale>
       <BarcodeScore>
       <MinimumAcceptableRank>1</MinimumAcceptableRank>
       <DesiredRank>1</DesiredRank>        1255
       <CalculationVariable>bc</CalculationVariable>
       <SamplingPositionMatrix><UoM>mm</UoM><XPosition>200.00</Xposition><YPosition>100.00</Yposition>
       </SamplingPositionMatrix>
    </Barcode>

</QualityGoals>   1257
  <CxFReferenceData>    1258
     <CxF><Object ID="CXF1">
        <ReflectanceSpectrum>0.222 0.333 0.444 0.001 0.222 0.234 0.111 0.333 0.555 0.666 ... 0.222</ReflectanceSpectrum>
     </Object></CxF>
  </CxFReferenceData>    1260
  <TagCollection>               1261
     <Tag Name="DeliveryMethod" Value="CutSheet"/>
  </TagCollection>
</PRX>
```

FIG. 12C

```
MEASURED DATA:
DATE: 2019-3-27:
TIME: 11:45:00 JST:
SHEET COUNT: 500:          ⌐1262
SHEET LOCATION METERAGE: 221.35M:  ⌐1263
METADATA: (XXXX:YYY), (ZZZ:AAA), (BBB:CCC):

SPECTRUM DATA:
0.222
0.333
0.444
0.001
0.222
0.234    ⌐1264
0.111
0.333
0.555
0.666
 . . .
0.222
SPECTRUM DATA END:

REGISTRATION DATA:
X DIRECTION OFFSET: 0.001:
Y DIRECTION OFFSET: 0.001:   ⌐1265
REGISTRATION DATA END:

BARCODE TEST DATA:
RESULT: PASS:          ⌐1266
BARCODE TEST DATA END:
```

FIG. 12D

```
<?xml version="1.0" encoding="UTF-8"?>
<PQX xmlns:pqx="http://xxx.org/pqx" xmlns:cc="http://yyy.com/CxF" xmlns="http://zzz.org/pqx"
xmlns:xsi="http://www.w3.org/2001/XMLSchema-instance"
xsi:schemaLocation="http://xxx.yyy.zzz.org/pqx PQX.xsd">
                                                                                    1267
    <PQXInfo><PQXDate>2019-03-27</PQXDate><PQXId>xxx</PQXId></PQXInfo>
    <PrinterInfo><CompanyName>AAA Printing Company</CompanyName><Location>xxxxx</Location></PrinterInfo>
    <PressRunInfo>  1268
        <DatePrinted>2019-03-27</DatePrinted>                                1269
        <PrinterLotId>Lot No.3</PrinterLotId>
        <RunLength TotalRolls="" TotalPackage="10" TotalMeterage="" UoM="sheet" TotalSheetCount="10000"/>
        <RunLength TotalRolls="10" TotalPackage="" TotalMeterage="2000" UoM="mt" TotalSheetCount=""/>
        <PrintMethod>ElectroPhotography</PrintMethod>                         1270
        <PressOperator>Mr. Right</PressOperator>
        <PrinterJobNumber>JobID01</PrinterJobNumber>
    </PressRunInfo>                                    1271
    <ReporterCollection>....</ReporterCollection>
    <CustomerCollection><Customer>ABC Ltd.</Customer></CustomerCollection>

<SampleCollection>  1272
        <Sample>
            <SampleDescription>                        1273
                <RunPosition Roll="5" Sheet="" Meterage="1000" UoM="mt"/>
                <RunPosition Roll="" Sheet="500" Meterage="" Lot="3" UoM="sheet"/>  1274
            </SampleDescription>
            <ColorReport>  1275       1276
                <Measurement Id="001">
                    <CxFSampleObjectIdLink>CXF001</CxFSampleObjectIdLink>              1277
                </Measurement>
                <SamplingPositionMatrix><UoM>mm</UoM><XPosition>12.34</Xposition><YPosition>5.23</Yposition>
            </ColorReport>
            <RegistrationReport>  1278
                <UoM>mt</UoM>        1279
                <XMaxOffset>0.001</XMaxOffset>                                          1281
                <YMaxOffset>0.002</YMaxOffset>  1280
                <SamplingPositionMatrix><UoM>mm</UoM><XPosition>3.00</Xposition><YPosition>3.00</Yposition>
            </RegistrationReport>
            <BarcodeReport>  1282
                <ISO2DVerification>
                    <Decoce>pass</Decode>  1283                                          1284
                </ISO2DVerification>
                <SamplingPositionMatrix><UoM>mm</UoM><XPosition>200.00</Xposition><YPosition>100.00</Yposition>
            </BarcodeReport>

</Sample>
    </SampleCollection>

<CxFSampleData>  1285
        <CxF Id="CxF001">
            <ReflectanceSpectrum>0.221 0.330 0.443 0.001 0.221 0.235 0.110 0.330 0.559 0.662 ... 0.221</ReflectanceSpectrum>
        <CxF>
    </CxFSampleData>   1286
</PQX>
```

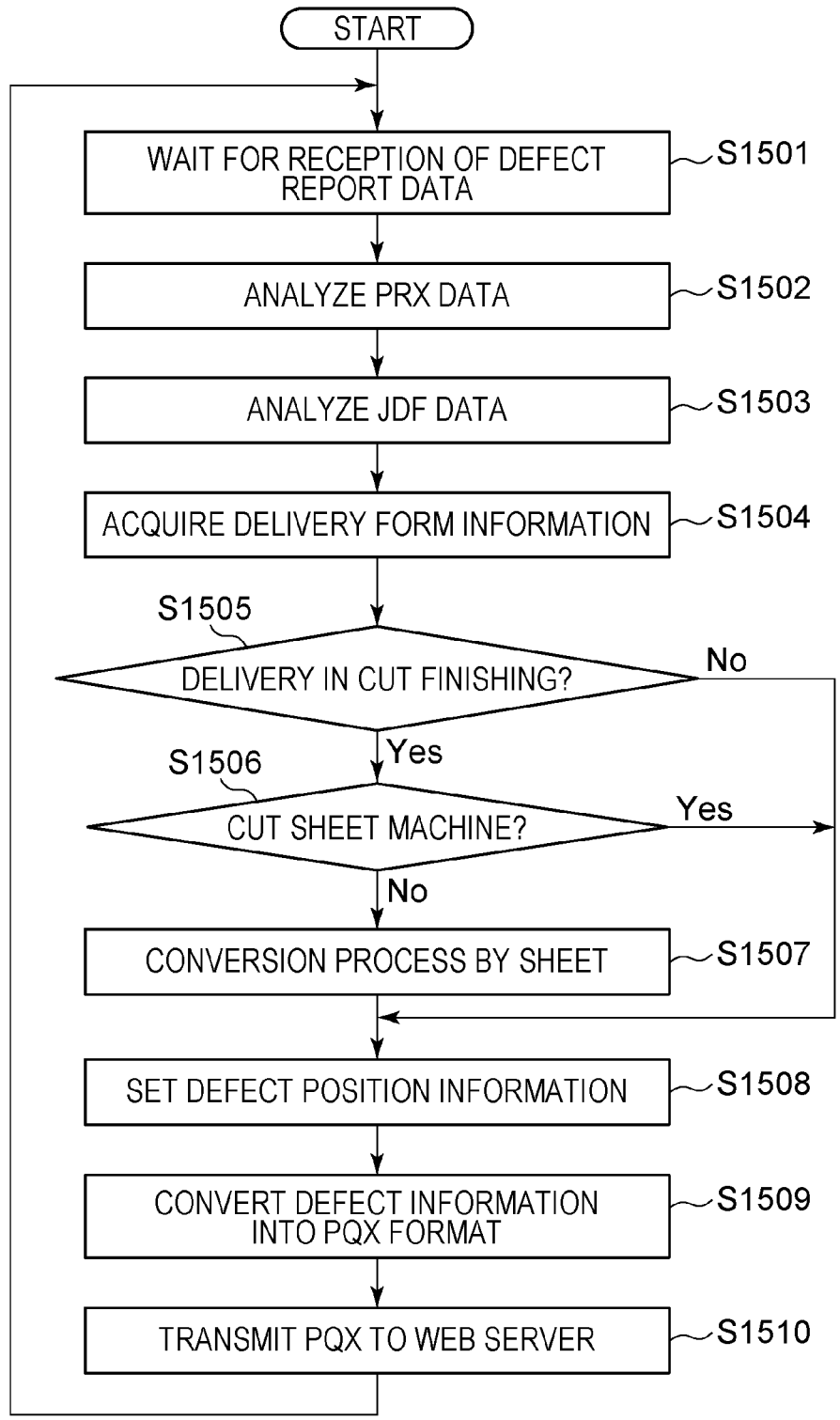

FIG. 16

```
<?xml version="1.0" encoding="UTF-8"?>
<PQX xmlns:pqx="http://xxx.org/pqx" xmlns:cc="http://yyy.com/CxF" xmlns="http://zzz.org/pqx"
xmlns:xsi="http://www.w3.org/2001/XMLSchema-instance"
xsi:schemaLocation="http://xxx.yyy.zzz.org/pqx PQX.xsd">

<PQXInfo><PQXDate>2019-03-27</PQXDate><PQXId>xxx</PQXId></PQXInfo>
  <PrinterInfo><CompanyName>AAA Printing Company</CompanyName><Location>xxxxx</Location></PrinterInfo>

<PressRunInfo>
     <DatePrinted>2019-03-27</DatePrinted>
     <PrinterLotId>Lot No.3</PrinterLotId>
       <RunLength TotalRolls="10" TotalPackage="" TotalMeterage="2000" UoM="mt" TotalSheetCount=""/>    1601
     <PrintMethod>ElectroPhotography</PrintMethod>
     <PressOperator>Mr. Right</PressOperator>
     <PrinterJobNumber>JobID01</PrinterJobNumber>
  </PressRunInfo>

<ReporterCollection>....</ReporterCollection>
  <CustomerCollection><Customer>ABC Ltd.</Customer></CustomerCollection>

<SampleCollection>
    <Sample>
      <SampleDescription>
         <RunPosition Roll="5" Sheet="" Meterage="1000" UoM="mt"/>
         <RunPosition Roll="" Sheet="500" Meterage="" Lot="3" UoM="sheet"/>
      </SampleDescription>

<ColorReport>
         <Measurement Id="001">
             <CxFSampleObjectIdLink>CXF001</CxFSampleObjectIdLink>
         </Measurement>
         <SamplingPositionMatrix><UoM>mm</UoM><XPosition>12.34</Xposition><YPosition>5.23</Yposition>
      </ColorReport>

<RegistrationReport>
         <UoM>mt</UoM>
         <XMaxOffset>0.001</XMaxOffset>
         <YMaxOffset>0.002</YMaxOffset>
         <SamplingPositionMatrix><UoM>mm</UoM><XPosition>3.00</Xposition><YPosition>3.00</Yposition>
      </RegistrationReport>

<BarcodeReport>
         <ISO2DVerification>
            <Decoce>pass</Decode>
         </ISO2DVerification>
         <SamplingPositionMatrix><UoM>mm</UoM><XPosition>200.00</Xposition><YPosition>100.00</Yposition>
      </BarcodeReport>

</Sample>
  </SampleCollection>

<CxFSampleData>
     <CxF Id="CxF001">
        <ReflectanceSpectrum>0.221 0.330 0.443 0.001 0.221 0.235 0.110 0.330 0.559 0.662 ... 0.221</ReflectanceSpectrum>
     <CxF>
  </CxFSampleData>
</PQX>
```

FIG. 19A

```
MEASURED DATA:
DATE: 2019-3-27:
TIME: 11:45:00 JST:
SHEET COUNT: 1:        ~1901
LOT NUMBER: 2:         ~1902
METADATA: (XXXX:YYY), (ZZZ:AAA), (BBB:CCC):

SPECTRUM DATA:
0.222
0.333
0.444
0.001
0.222
0.234
0.111
0.333
0.555
0.666
. . .
0.222
SPECTRUM DATA END:

REGISTRATION DATA:
X DIRECTION OFFSET: 0.001:
Y DIRECTION OFFSET: 0.001:
REGISTRATION DATA END:

BARCODE TEST DATA:
RESULT: PASS:
BARCODE TEST DATA END:
```

FIG. 19B

```
<?xml version="1.0" encoding="UTF-8"?>
<PQX xmlns:pqx="http://xxx.org/pqx" xmlns:cc="http://yyy.com/CxF" xmlns="http://zzz.org/pqx"
xmlns:xsi="http://www.w3.org/2001/XMLSchema-instance"
xsi:schemaLocation="http://xxx.yyy.zzz.org/pqx PQX.xsd">

<PQXInfo><PQXDate>2019-03-27</PQXDate><PQXId>xxx</PQXId></PQXInfo>
  <PrinterInfo><CompanyName>AAA Printing Company</CompanyName><Location>xxxxx</Location></PrinterInfo>

<PressRunInfo>
      <DatePrinted>2019-03-27</DatePrinted>
      <PrinterLotId>Lot No.3</PrinterLotId>
      <RunLength TotalRolls="" TotalPackage="10" TotalMeterage="" UoM="sheet" TotalSheetCount="10000"/>
      <RunLength TotalRolls="10" TotalPackage="" TotalMeterage="2000" UoM="mt" TotalSheetCount=""/>
      <PrintMethod>ElectroPhotography</PrintMethod>
      <PressOperator>Mr. Right</PressOperator>
      <PrinterJobNumber>JobID01</PrinterJobNumber>
  </PressRunInfo>

<ReporterCollection>....</ReporterCollection>
  <CustomerCollection><Customer>ABC Ltd.</Customer></CustomerCollection>

<SampleCollection>
      <Sample>
          <SampleDescription>
              <RunPosition Roll="" Sheet="1" Meterage="" Lot="2" UoM="sheet"/>    1903
          </SampleDescription>

<ColorReport>
              <Measurement Id="001">
                  <CxFSampleObjectIdLink>CXF001</CxFSampleObjectIdLink>
              </Measurement>
              <SamplingPositionMatrix><UoM>mm</UoM><XPosition>12.34</Xposition><YPosition>5.23</Yposition>
          </ColorReport>

<RegistrationReport>
              <UoM>mt</UoM>
              <XMaxOffset>0.001</XMaxOffset>
              <YMaxOffset>0.002</YMaxOffset>
              <SamplingPositionMatrix><UoM>mm</UoM><XPosition>3.00</Xposition><YPosition>3.00</Yposition>
          </RegistrationReport>

<BarcodeReport>
              <ISO2DVerification>
                  <Decoce>pass</Decode>
              </ISO2DVerification>
              <SamplingPositionMatrix><UoM>mm</UoM><XPosition>200.00</Xposition><YPosition>100.00</Yposition>
          </BarcodeReport>

</Sample>
  </SampleCollection>

<CxFSampleData>
      <CxF Id="CxF001">
          <ReflectanceSpectrum>0.221 0.330 0.443 0.001 0.221 0.235 0.110 0.330 0.559 0.662 ...0.221</ReflectanceSpectrum>
      <CxF>
  </CxFSampleData>
</PQX>
```

INFORMATION PROCESSING APPARATUS AND CONTROL METHOD THEREFOR

CROSS-REFERENCE TO RELATED APPLICATIONS

This application is a Continuation of International Patent Application No. PCT/JP2020/026955, filed Jul. 10, 2020, which claims the benefit of Japanese Patent Application No. 2019-145570, filed Aug. 7, 2019, both of which are hereby incorporated by reference herein in their entirety.

TECHNICAL FIELD

The present invention relates to quality reports on a print product.

BACKGROUND ART

In the field of commercial printing, it is conceivable that information on requirements and a report on the quality of a product for which a customer makes a request of a printing company is electronically exchanged. Standards, such as PQX/PRX (Print Quality eXchange, Print Request eXchange) and JDF (Job Definition Format), are examples of the specifications for achieving the above. A series of processes in which a customer transmits by PRX requirements on the quality of a product required of a printing company and the printing company reports the quality of a product produced to the customer by PQX is electronized.

CITATION LIST

Patent Literature

PTL 1 Japanese Patent Laid-Open No. 2016-118446

SUMMARY OF INVENTION

For example, PQX that is an example of quality report data has specifications to designate a position at which quality inspection is performed by the length from the leading edge of roll paper. In other words, when a print product is manufactured with a continuous form machine that forms an image on a sheet continuous in a rolled shape, it is assumed to generate quality report data. Therefore, when a print product is manufactured with a cut sheet machine that forms an image on a sheet cut sheet by sheet, a position at which quality inspection is performed is designated by the length from the leading edge of the sheets even when quality report data is generated. In this case, although a customer receives delivery in a cut sheet form, a position at which quality inspection is performed is designated by the length from the leading edge of the sheets, so there is a problem that the customer is hard to find a position at which quality inspection is performed.

The present invention is intended to provide a technology for a customer to easily find a position at which quality inspection is performed in a quality report on a product in accordance with a delivery form.

To resolve the above-described problem, the present invention includes inspection means configured to perform quality inspection on a print product, acquisition means configured to acquire delivery form information on the print product, and generating means configured to generate position information indicating a position of the quality inspection in accordance with the acquired delivery form information and generate quality report data including the position information.

Further features of the present invention will become apparent from the following description of exemplary embodiments with reference to the attached drawings.

BRIEF DESCRIPTION OF DRAWINGS

FIG. 10C is a first view for illustrating the operating unit of the application system in the first embodiment.

FIG. 12A is a view for illustrating a data format in the first embodiment.

FIG. 12B is a view for illustrating a data format in the first embodiment.

FIG. 12C is a view for illustrating a data format in the first embodiment.

FIG. 12D is a view for illustrating a data format in the first embodiment.

FIG. 15 is a second flowchart for illustrating the operation of the work flow control unit in the first embodiment.

FIG. 16 is a view for illustrating a data format transmitted and received among a customer system, a printing company system, and system component modules in a second embodiment.

FIG. 19A is a view for illustrating a data format in a third embodiment.

FIG. 19B is a view for illustrating a data format in the third embodiment.

DESCRIPTION OF EMBODIMENTS

Hereinafter, embodiments of the present invention will be described with reference to the drawings. The following embodiments do not limit the invention described in the appended claims. Not all combinations of features that will be described in the embodiments are indispensable for solutions of the invention.

First Embodiment

Figure 1:
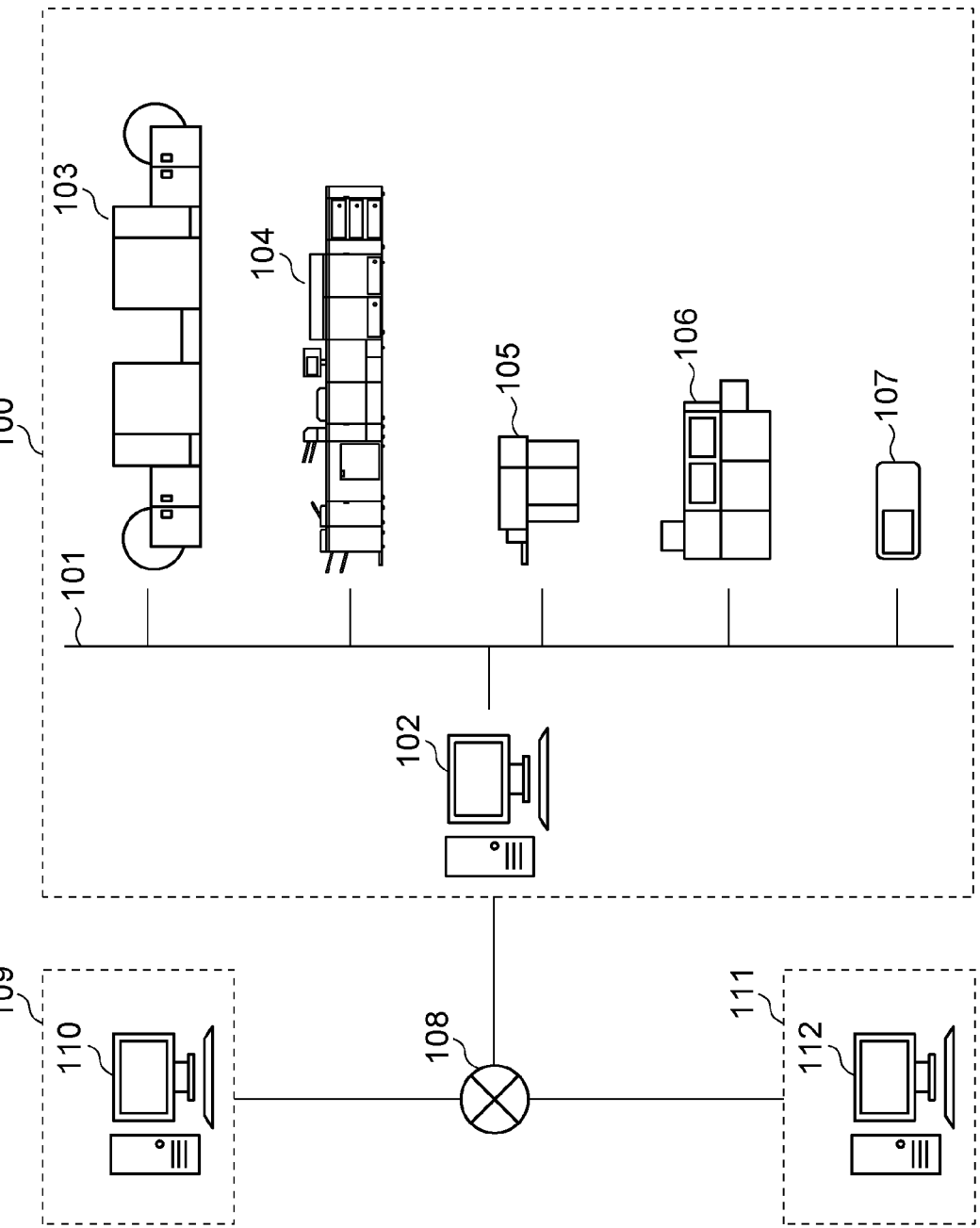
FIG. 1 is a block diagram showing an entire print processing system in a first embodiment.

FIG. 1 is a block diagram showing a system according to the present embodiment.

The system is broadly divided into a customer system 109, a printing company system 100, and a parent company system 111 of a printing company that are connected to one another by the Internet 108. The customer system 109 includes at least one or more information processing apparatuses 110. Similarly, the parent company system 111 also includes at least one or more information processing apparatuses 112.

Hereinafter, the internal configuration of the printing company system 100 will be described in detail. As shown in FIG. 1, a plurality of apparatuses is connected to one another by a network 101. As these apparatuses, an information processing apparatus 102, an image forming apparatus 103, an image forming apparatus 104, a laminator 105, a wireless binder 106, and a colorimeter 107 are connected. The image forming apparatus 103 is an image forming apparatus for continuous form sheets. The image forming apparatus 104 is an image forming apparatus for cut sheets. By using these apparatuses with different printing mechanisms, a printing company is able to produce a product (print product) requested from a customer in an optimal mode.

The apparatuses are controlled under command of work flow software that operates on the information processing apparatus 102, process job data submitted by the customer system 109, and produce a product. Job data submitted from the customer system 109 includes image data, job ticket, and quality requirements data. The job ticket has, for example, JDF format. The quality requirements data has, for example, PRX format. Furthermore, the information processing apparatus 102 in the printing company system 100 also has functions to receive notification of the above-described processing results of the apparatuses and to convert the processing results to quality report data and transmit the quality report data to the customer system 109. The format of quality report data is, for example, PQX format.

When a series of processes in which a customer transmits by PRX requirements on the quality of a product required of a printing company and the printing company reports the quality of a product produced to the customer by PQX is electronized, the following benefits are obtained.

Firstly, it is possible to obtain the effect of reducing the possibility of mutual erroneous recognition on product quality by quantitatively providing requirements on the quality of a product for which a customer makes a request of a printing company as has been performed in the past. Secondly, a printing company is able to electronically visualize the quality of a product produced, so a customer is able to immediately grasp the quality of a product requested for production. Thirdly, as the effect of electronization of requirements and a report on quality, even in production of a product over a long term, it is easy for a customer and a printing company to uniformize the quality even when time-series fluctuations in quality can occur. Fourthly, even when a customer makes a request of a plurality of printing companies for production, it is easy for the customer and the printing companies to uniformize the quality while visualizing variations in quality among the plurality of printing companies at the same time.

When the customer system 109 makes a request of the printing company system 100 for production, a printing company switches between the image forming apparatus 103 and the image forming apparatus 104 in view of information designating a delivery form and the like and performs production in an optical mode. When a printing company transmits a report on the quality of a product to a customer, the printing company variably creates inspection information included in report details, more specifically, a mode of information on a part at which inspection is performed, in accordance with a delivery form.

Figure 2:
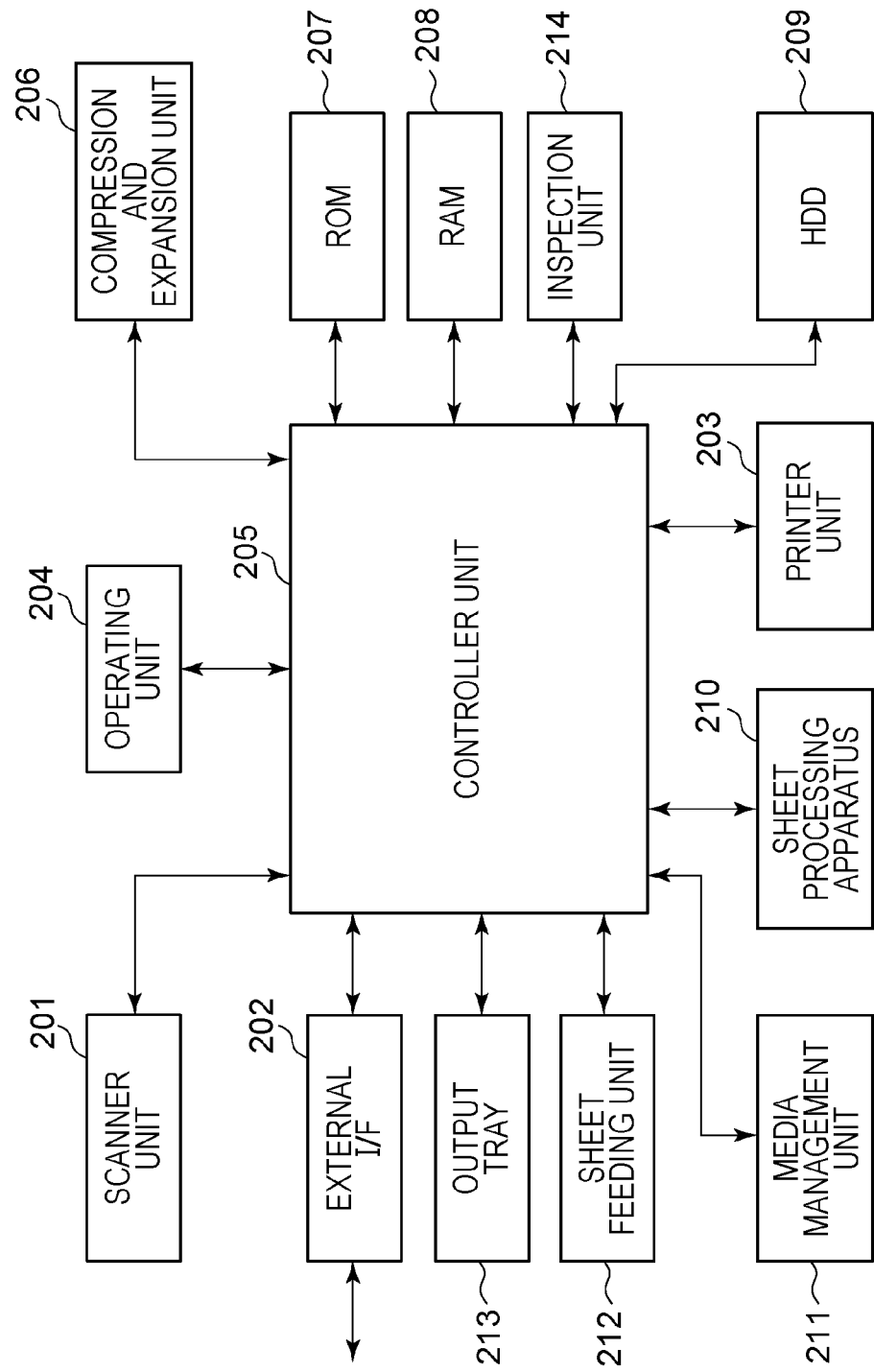
FIG. 2 is a hardware configuration diagram of an image forming apparatus in the first embodiment.

FIG. 2 is a diagram illustrating the hardware configuration of the image forming apparatus 104. The image forming apparatus 104 has a reading function to read an image on a sheet and a printing function to print an image on a sheet. The image forming apparatus 104 has a post-processing function to bind a plurality of sheets on which images are printed, to align a plurality of sheets, and to separately discharge a plurality of sheets to a plurality of trays. Sheets include paper, such as plain paper and thick paper, film sheet, and the like.

The image forming apparatus 104 shown in the drawing is configured such that a plurality of apparatuses having different roles are coupled to one another and complex sheet processing is possible.

The image forming apparatus 104 is an apparatus used to convey a piece of media stored in a sheet feeding unit 212 and form an image onto the piece of media by using toner in accordance with expanded image data.

The image forming apparatus 104 includes a scanner unit 201 and an operating unit 204. The operating unit 204 provides various interfaces in the case where an operator performs various settings, operations, and the like of the image forming apparatus 104.

The image forming apparatus 104 in the present embodiment is configured such that various associated apparatuses are able to be attached. In the present embodiment, a sheet processing apparatus 210 is described as an example of the associated apparatus.

The sheet processing apparatus 210 is an apparatus for obtaining a product obtained by applying various types of processing to a piece of media after an image is formed by a printer unit 203.

An output tray 213 discharges an output product processed by the sheet processing apparatus 210 and forms a tray unit for loading.

An inspection unit 214 is a module provided to inspect image information formed on a sheet by the printer unit 203. Targets to be inspected include a print position misalignment amount (registration misalignment amount) of each of prints of CMYK and a difference (color difference) between a color with which an image is formed by combining the prints of CMYK and a color specified by print data. Furthermore, targets to be inspected include the reading accuracy of a barcode part included in an image formed, general image defects, such as a rubbed area and a scratch, on an image, and the like. The module has a function to optically read an image on a sheet after image formation for these defects of the image and to convert the defects to inspection result data.

A hard disk drive 209 (hereinafter, also referred to as HDD) is a non-volatile memory and stores a plurality of pieces of job data to be processed, various pieces of management information, and the like.

Job data received from the scanner unit 201 is printed by the printer unit 203 via the HDD 209. Job data received from an external apparatus via an external I/F 202 corresponding to an example of a communication unit is printed by the printer unit 203 via the HDD 209.

The external I/F 202 transmits and receives image data to and from a facsimile, a network connection device, and an external dedicated apparatus. The operating unit 204 corresponds to a user interface unit and has a display unit here. The controller unit 205 (also referred to as control unit or CPU) generally controls the processes, operations, and the like of various units provided in the image forming apparatus 104. The ROM 207 stores various control programs to be used in the present embodiment, including a program for executing various processes and the like of a flowchart (described later). The ROM 207 also stores a display control program for causing the display unit of the operating unit 204, including a user interface screen (hereinafter, referred to as UI screen), to display various UI screens.

The controller unit 205 causes the image forming apparatus 104 to execute various operations described in the present embodiment by reading and running programs in the ROM 207. A program or the like for interpreting code data forming print data, such as PDF, received from an external apparatus and expanding the code data into raster image data (bitmap image data) is also stored in the ROM 207. A program or the like for interpreting a print job received from an external apparatus (not shown) via the external I/F 202 and processing the print job is also stored in the ROM. These are processed mainly by software. The details of various programs stored in the ROM 207 will be described later.

The HDD 209 (hard disk drive) is a large-capacity storage device that stores image data compressed by a compression and expansion unit 206. The HDD 209 is configured to be capable of holding a plurality of pieces of data, such as print data of a job to be processed. The controller unit 205 controls data of a job to be processed, input via various input units including the scanner unit 201, the external I/F 202, and the like such that the data can be printed by the printer unit 203 via the HDD 209. The controller unit 205 also controls data of a job to be processed such that the data can be transmitted to an external apparatus via the external I/F 202. In this way, the controller unit 205 controls data of a job to be processed, stored in the HDD, such that various output processes for the data can be executed. Furthermore, the controller unit 205 is configured to be capable of implementing functions of file sharing, file transmission and reception, and the like of a file system constructed in the HDD 209 for an external apparatus by reading and running programs in the ROM 207.

Figure 3:
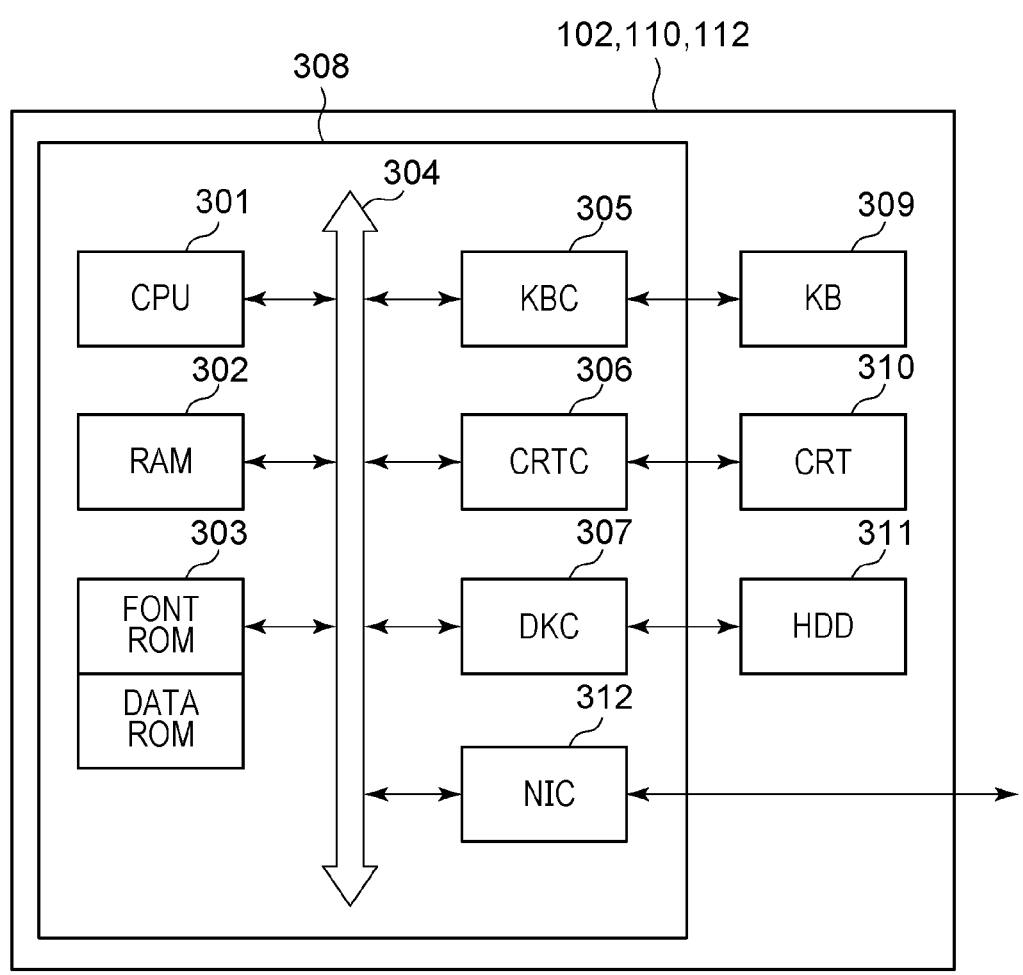
FIG. 3 is a hardware configuration diagram of an information processing apparatus in the first embodiment.

The compression and expansion unit 206 performs compression and expansion operation on image data and the like stored in the RAM 208 or the HDD 209 in accordance with various compression formats, such as JBIG and JPEG. With the above-described configuration, the controller unit 205 serving as an example of the control unit of the printing system also controls the operations of each sheet processing apparatus 210. A media management unit 211 is a module for managing information on media species. The inspection unit 214 is a module provided to inspect image information formed on a sheet under control of the controller unit 205 over the modules that make up the image forming apparatus 104 shown in the drawing. Inspection result information converted to inspection result data by the module is transmitted to the information processing apparatus 102 via the external I/F 202. FIG. 3 is a block diagram showing the configuration of each of the information processing apparatuses 102, 110, 112.

In the drawing, the CPU 301 runs an OS and general application programs stored in a program ROM of the ROM 303 or loaded from the HDD 311 to the RAM 302. The ROM 303 has a font ROM and a data ROM. The RAM 302 functions as a main memory, a work area, and the like of the CPU 301. A keyboard controller (KBC) 305 controls entry from a keyboard or a pointing device (not shown). A display controller (CRTC) 306 controls display on a display unit (CRT) 310. A disk controller (DKC) 307 controls access to the HDD 311 and the like that store a boot program, various applications, font data, and the like. A network controller (NIC) 312 is connected to a network and executes a communication control process with another device connected to the network. A bus 304 connects the CPU 301 to the RAM 302, the ROM 303, various controllers, and the like and carries data signals and control signals.

In the case of a mobile terminal, a touch panel controller or the like may be included in the configuration instead of the keyboard controller (KBC) 305. A large-capacity storage device that substitutes for the HDD 311 may be provided. Furthermore, the network controller (NIC) 312 has a different internal configuration among a case where the host apparatus includes a wired LAN, a case where the host apparatus includes a wireless LAN, and a case where the host apparatus includes both. However, these differences in internal configuration are hidden inside the network controller (NIC) 312, and those internal configurations are configured so as to be capable of controlling the system as equivalent ones for the other modules shown in the drawing.

Figure 4:
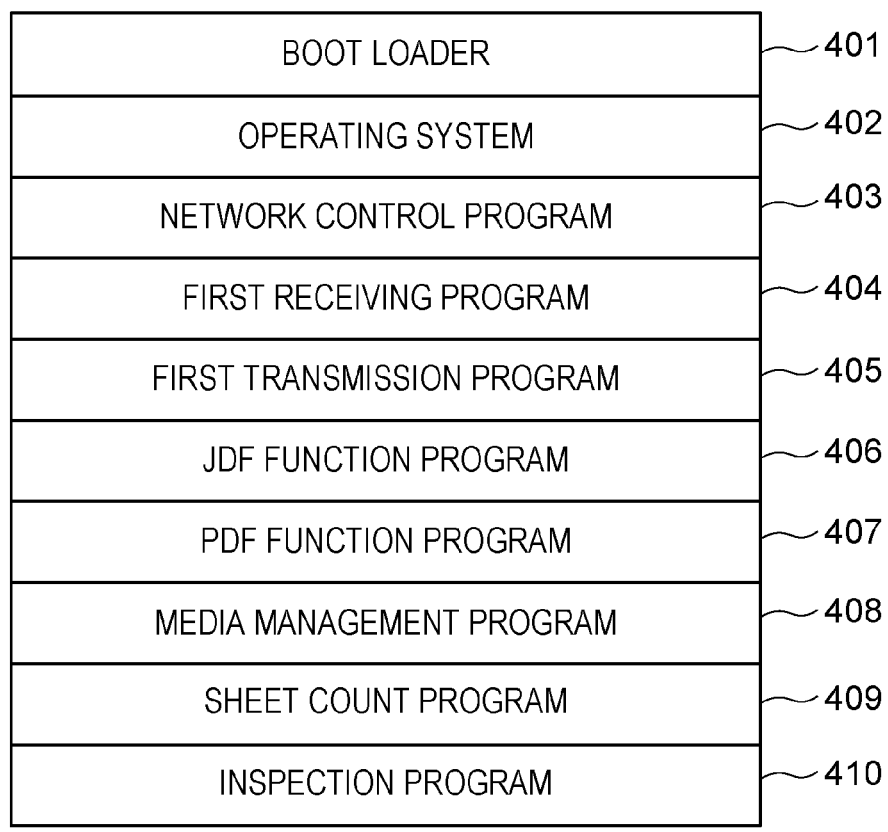
FIG. 4 is a software configuration diagram of the image forming apparatus in the first embodiment.

FIG. 4 is a diagram illustrating programs of the image forming apparatus 104. These programs are stored in the ROM 207 and are read and run by the controller unit 205 of the image forming apparatus 104.

A boot loader 401 is a program that is run just after the power of the image forming apparatus 104 is turned on. The programs include a program for executing various boot sequences needed to boot the system.

An operating system 402 is a program intended to provide an environment to run various programs that implement the functions of the image forming apparatus 104. This provides functions of recourses management for mainly the memory of the image forming apparatus 104, that is, the ROM 207, the RAM 208, HDD 209, and the like and basic input/output control and the like of the other units shown in FIG. 2.

A network control program 403 is a program that is run when data is transmitted and received to and from devices connected via the network. The program is used when various processes, such as a process of receiving a file to be printed, data transmission from an external apparatus, transmission and reception of a command, and transmission of digital data generated as a result of inspection performed by the inspection unit 214. The network control program includes a driver program for controlling the external I/F 202.

A first receiving program 404 is a program for receiving various instructions and information from the information processing apparatus 102. Information and instructions to be received by the program include designation of image information to be inspected by the inspection unit 214.

A first transmission program 405 is a program for transmitting information to the information processing apparatus 102. Information to be transmitted by the program includes inspection result data generated as a result of inspection performed by the inspection unit 214.

A JDF function program 406 is a program that, when JDF job data is received by the image forming apparatus 104 via the external I/F 202, executes a JDF print function that is executed by the controller unit 205 in response to an instruction from the external I/F 202. With the JDF print function, the controller unit 205 sequentially provides an instruction for the operation of each of the devices shown in FIG. 2 in appropriate order in accordance with processing order and processing conditions described in the program. As a result, the devices are controlled such that the JDF print process is eventually executed. The devices include the sheet processing apparatus 210, the printer unit 203, the HDD 209, the compression and expansion unit 206, the RAM 208, and the like. The JDF print process also includes a process of analyzing JDF job data received via the external I/F 202, a process of determining whether an incorrect setting is included in JDF as a result of the analyzing process, and a program process of making setting changes and the like for resolving the incorrect setting.

When PDF data (print target image data) is received by the image forming apparatus 104 via the external I/F 202, a PDF function program 407 executes a process of expanding the PDF data, and a print function, executed by the controller unit 205. With the PDF function executed by the controller unit 205, the controller unit 205 sequentially provides an instruction for the operation of each of the devices shown in FIG. 2 in appropriate order in accordance with the processing order and processing conditions described in the program. As a result, the devices are controlled such that the PDL print process is eventually executed. The devices include the sheet processing apparatus 210, the printer unit 203, the HDD 209, the compression and expansion unit 206, the RAM 208, and the like. The PDF function program in the present embodiment is configured to operate together with the JDF function program 406 as various designation at the time of executing a print process.

A media management program 408 is a program for executing a management function related to sheets available to the image forming apparatus 104. Sheet-related information managed by the program is stored in the HDD 209.

A sheet count program 409 is a program for accumulating, managing, and storing the number of sheets used for printing at the time of forming an image by the printer unit 203 on sheets stored in the sheet feeding unit 212 of the image forming apparatus 104 in association with sheet size information.

An inspection program 410 is a program for controlling the inspection unit 214, inspecting an output result image, and generating inspection result data. Inspection result data generated by the program is transmitted to the information processing apparatus 102 by the first transmission program 405.

Figure 5:
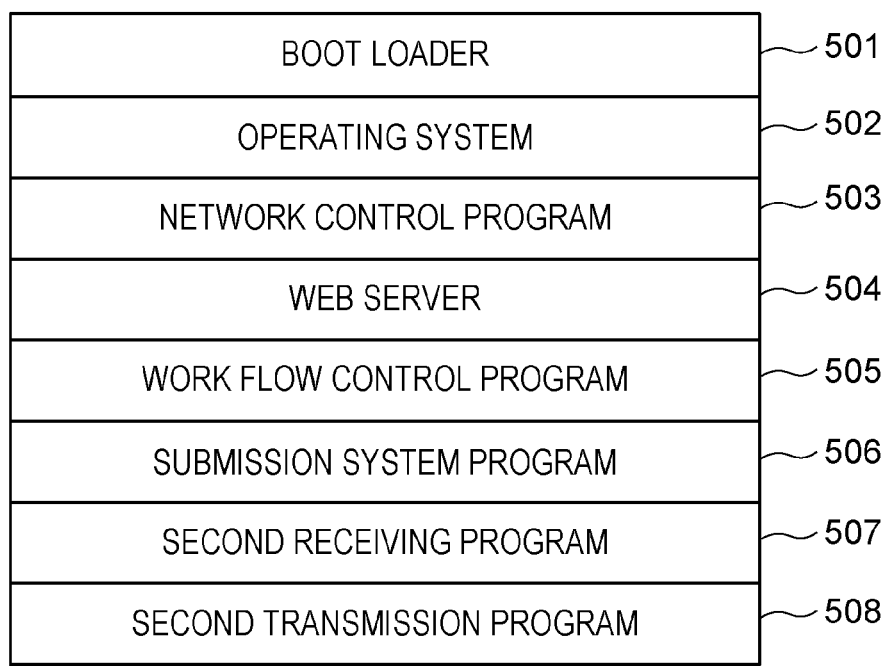
FIG. 5 is a software configuration diagram of the information processing apparatus of a printing company system in the first embodiment.

FIG. 5 is a diagram illustrating the configuration of programs installed in the information processing apparatus 102 in the printing company system 100.

A boot loader 501 is a program that is run just after the power of the information processing apparatus 102 is turned on. These programs include a program for executing various boot sequences needed to boot the system.

An operating system 502 is a program intended to provide an environment to run various programs that implement the functions of the information processing apparatus 102. This provides functions of resources management and the like for the memory of the information processing apparatus, that is, the ROM 303, the RAM 302, the HDD 311, and the like.

A network control program 503 is a program that is run when data is transmitted and received to and from devices connected via the network. In other words, the network control program 503 is used at the time of transmitting print job data to the image forming apparatus (103, 104) and providing an instruction for a print process. The network control program 503 is also used at the time of providing an instruction to the laminator 105 to apply a decorating process to a printed product. The network control program 503 is also used at the time of providing an instruction to the wireless binder 106 to perform post-processing on a product. The network control program 503 is also used at the time of causing the image forming apparatus (103, 104) to provide an inspection instruction to the inspection unit 214 via the first receiving program. The network control program 503 is also used at the time of receiving quality report data from the inspection unit 214 via the first transmission program 405.

A web server 504 is a server program for allowing an external device connected via a network to use web services. Various services provided by the web server 504 are conceivable. However, the present embodiment describes an example in the case where the service is provided as a means at the time of submitting data to be ordered from the customer system 109 to the printing company system 100. In addition, an example in which the service is provided as a means of acquiring PQX information that is a quality report for determining whether quality requirements set for a printing company by a customer at the time of submission are achieved is described.

A work flow control program 505 is a program for centrally managing processes, control, job execution, and the like among devices connected via the network 101 inside the printing company system 100 and forms the heart of the printing company system 100. At the time of manufacturing a product by using a plurality of steps, that is, a plurality of apparatuses, the work flow control program 505, for example, controls the order of execution and executes jobs. The work flow control program 505 also controls selection, switching, recovery production, and the like of an apparatus to be used. The work flow control program 505 also executes a process of providing various instructions to operators working inside the printing company system 100. Furthermore, an example of a mode in which the work flow control program 505 according to the present embodiment also provides a PQX creation means that receives measured data on the quality of a print image from the inspection unit 214 of the image forming apparatus 104 and converts the measured data into a PQX format is described.

A submission system program 506 is software that mainly has a role in holding and managing data for which a request for production is received from the customer system 109 in the printing company system 100. The submission system program 506 is a system that cooperates with the web server 504 and that is used to electronically execute various functions needed for order placement and reception work, for example, a series of processes including transmission of data, issuance of an invoice, and the like, between the customer system 109 and the printing company system 100. A selected communication specification is used between the customer system 109 and the printing company system 100, and a system supporting PrintTalk as a standard specification is widely known.

A second receiving program 507 is a program provided to receive PRX that is quality requirements data out of data submitted from the customer system 109. When the program receives PRX, the program analyzes the details and sets instructions, conditions, and the like for creating a product with quality required by a customer to apparatuses in the printing company system 100 as needed. Or the program provides information needed for an operator.

In the present embodiment, the example in which, when the printing company system 100 receives quality requirements data from the customer system 109, the printing company system 100 receives quality requirements data via the web server 504, and the second receiving program receives the received data has been described. As another mode, the second receiving program itself may directly receive quality requirements data from the customer system 109. Or the second receiving program 507 may take a mode of operating on the web server 504 as a web content.

A second transmission program 508 is a program for transmitting or acquiring PQX that is quality report data to the customer system 109 in order to determine whether a printing company complies with quality conditions designated by PRX that is quality requirements data during production. Inspection result data is received from the image forming apparatus 103, the image forming apparatus 104, or another apparatus in a printing company and accumulated, and converted to data in PQX format at appropriate timing, and the customer system 109 is configured to be able to receive PQX via a communication means.

In the present embodiment, when the customer system 109 receives quality report data from the printing company system 100, the customer system 109 receives a request via the web server 504. The customer system 109 transmits quality report data as a response to the received request via the second transmission program. However, as another mode, the second transmission program itself may directly transmit quality report data to the customer system 109. Or the second transmission program 508 may take a mode of operating on the web server 504 as a web content.

Figure 6:
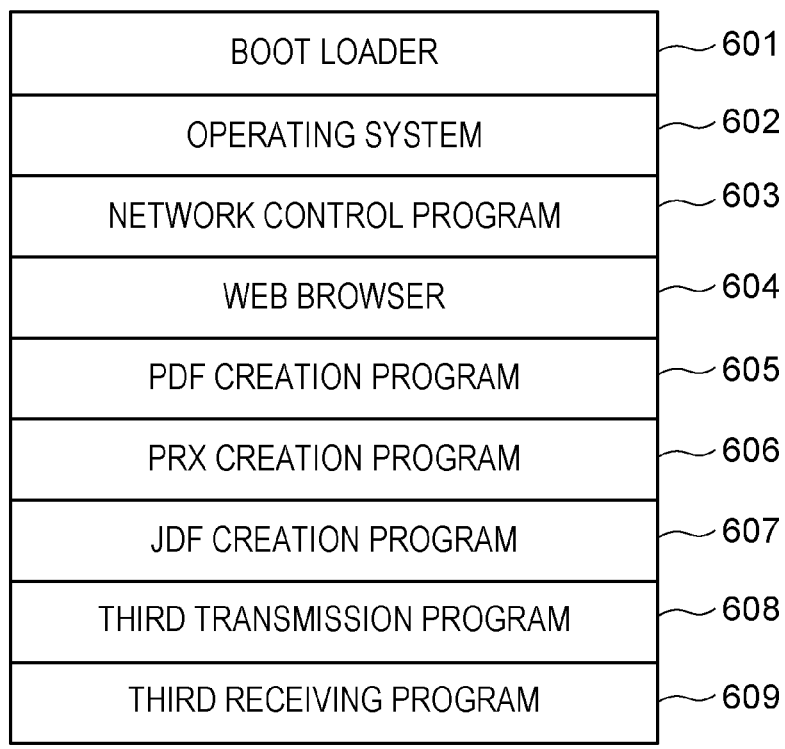
FIG. 6 is a software configuration diagram of the information processing apparatus of a customer system in the first embodiment.

FIG. 6 is a diagram illustrating the configuration of programs installed in the information processing apparatus 110 in the customer system 109.

A boot loader 601 is a program that is run just after the power of the information processing apparatus 110 is turned on. These programs include a program for executing various boot sequences needed to boot the system.

An operating system 602 is a program intended to provide an environment to run various programs that implement the functions of the information processing apparatus 110. This provides functions of resources management and the like for the memory of the information processing apparatus, that is, the ROM 303, the RAM 302, the HDD 311, and the like.

A network control program 603 is a program that is run when data is transmitted and received to and from apparatuses connected via the network. In other words, the network control program 603 is used at the time of, for example, performing transmission and reception of data to and from the printing company system 100 via the Internet 108. The network control program 603 is also used in a rendering display process and a data transmission and reception process using a web browser (described later).

The web browser 604 is a client program for using a web service provided by an external system connected via a network. Various services used by the web browser 604 are conceivable. In the present embodiment, the web browser 604 is used as a means at the time of making a data submission request that is a target to be ordered to the printing company system 100. In addition, the web browser 604 is also used as a means of acquiring PQX information that is a quality report for determining whether quality requirements set for a printing company by a customer at the time of submission is achieved.

A PDF creation program 605 is a program that creates image data in PDF format, which is a target that the customer system 109 makes a request of the printing company system 100 to produce. In the present embodiment, the example in which PDF format is used as the format of image data is described; however, a mode of another format may be used. Creation of PDF data also includes a process of, for example, adding an image to already-existing image data in PDF format.

A PRX creation program 606 is a program for, at the time when the customer system 109 makes a request of the printing company system 100 to produce, creating information for transmitting quality requirements on a product to be generated in PRX format. Specific details of quality requirements designated by the program, its setting method, and the created data format will be described later.

A JDF creation program 607 is a program for, at the time when the customer system 109 makes a request of the printing company system 100 for production, creating information for transmitting a form of a product to be produced, job execution conditions during production, job settings, and the like in JDF format. Specific details of setting information designated by the program, its setting method, and the created data format will be described later.

A third transmission program 608 is a program used to transmit quality requirements data in PRX format, created by the PRX creation program 606, from the customer system 109 to the printing company system 100.

A third receiving program 609 is a program used for the customer system 109 to receive quality report data in PQX format, created by the second transmission program 508, from the printing company system 100.

Figure 7:
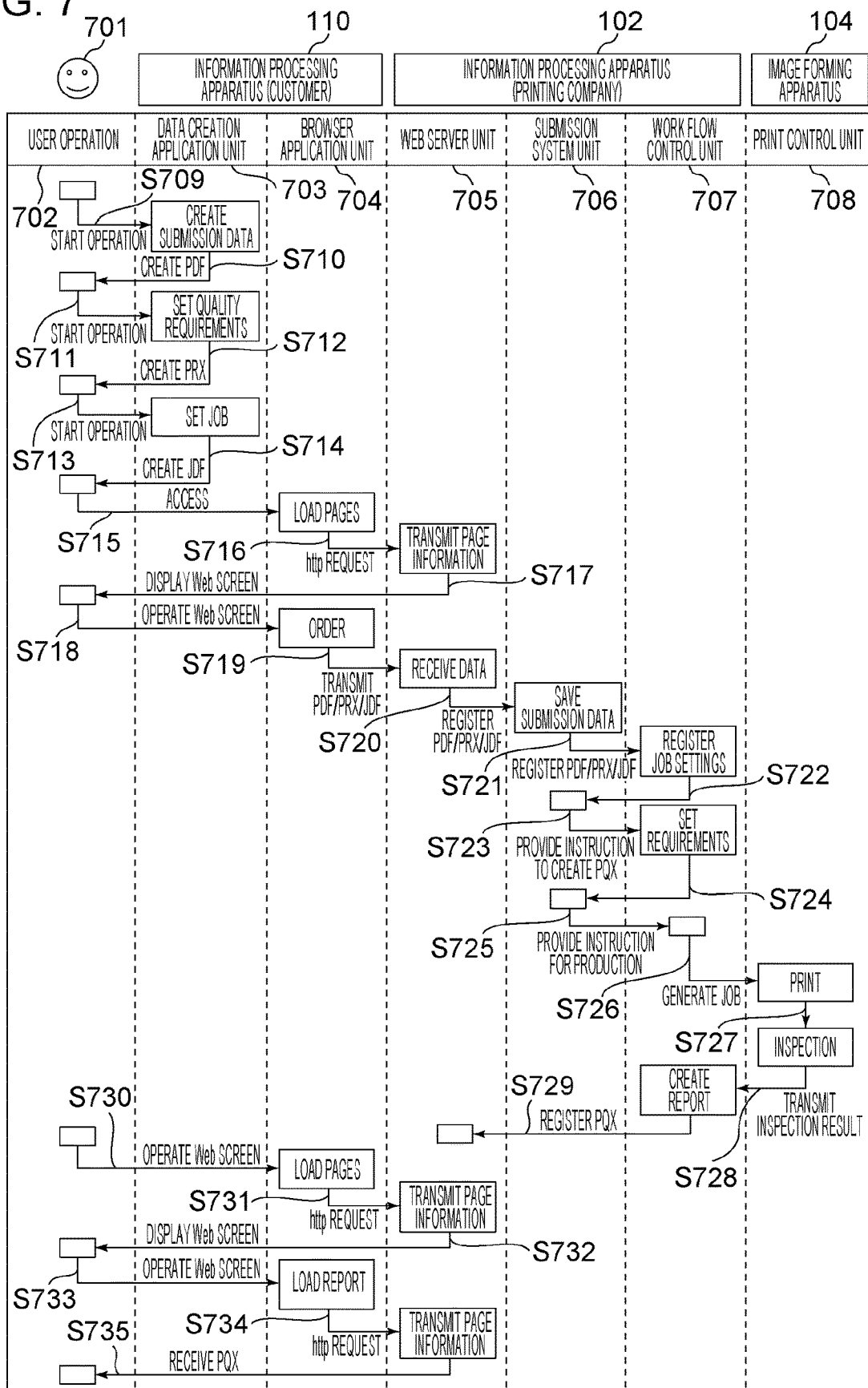
FIG. 7 is a process flow of the entire print processing system in the first embodiment.

FIG. 7 is a system flowchart at the time when the customer system 109, the printing company system 100, and a customer that is an operator of them, that is, a user, uses functions provided by the systems. A user 701 represents a user of the information processing apparatus 110 in the customer system 109.

Hereinafter, the flow of control transmitted and received among the systems in the course of operation 702 to be performed at the time when the functions provided by the system are provided to the user 701 in each of the systems of the user 701, the information processing apparatuses 110, 102, and the image forming apparatus 104 will be described. However, when a plurality of subsystems needs to perform processing while interacting with each other in each of the systems, the flow will be described at the level of those subsystems.

The subsystem of the user 701 is the user operation 702. This is a field showing the details of operation for instruction on the screen, the results of the operation, and related flow to occur in order for a user to implement a series of flows shown in the drawing. The information processing apparatus 110 of the customer system 109 is separated into two subsystems. In other words, those are two subsystems shown as a data creation application unit 703 and a web browser unit 704.

The data creation application unit 703 is implemented by the CPU 301 running the PDF creation program 605, the PRX creation program 606, and the JDF creation program 607. The web browser unit 704 is implemented by the CPU 301 running the web browser 604. The information processing apparatus 102 of the printing company system 100 is separated into three subsystems. In other words, those are three subsystems shown as a web server unit 705, a submission system unit 706, and a work flow control unit 707. The web server unit 705 is implemented by the CPU 301 running the web server 504. The submission system unit 706 is implemented by the CPU 301 running the submission system program 506. The work flow control unit 707 is implemented by the CPU 301 running the work flow control program 505.

In S709, the user provides an instruction to create data to be ordered to the printing company system 100. Specifically, the PDF creation program 605 receives operation resulting from the instruction of the step, and various processes for creating desired PDF image data are executed.

After creation of desired PDF image data is complete in S710, the user further provides an instruction to create quality requirements data on a product to be ordered to the printing company system 100 in S711. Specifically, the PRX creation program 606 receives operation resulting from the instruction of the step, and various processes for creating desired PRX data are executed.

After creation of desired PRX data is complete in S712, the user further provides an instruction to create job ticket on a product to be ordered to the printing company system 100 in S713. Specifically, the JDF creation program 607 receives operation resulting from the instruction of the step, and various processes for creating desired JDF data are executed.

At the stage at which creation of desired JDF data is complete in S714, creation of all the data to be submitted to a printing company completes, so the process proceeds next to a process of submitting data to the printing company. In S715, the user operates the web browser unit 704 and performs operation needed to display an operation screen for submitting data to the printing company. In other words, the web browser unit 704 outputs in S716 an http request needed for a rendering process to the web server unit 705 that operates on the printing company-side information processing apparatus 102 in accordance with URL information input in S715. The web server unit 705 receives a request and returns page information in S717 as a response. The user operates the submission screen displayed in S718 and provides an instruction to execute an ordering process on the web browser unit 704.

In response to the process of S718, the web browser unit 704 transmits various pieces of data, that is, PDF, PRX, and JDF, that is, submission data, to the web server unit 705 in S719. When the web server unit 705 receives submission data, the web server unit 705 executes a process of storing the pieces of submission data in the submission system unit 706 in S720. S721 and the following steps are steps of a production process to be executed in the printing company system 100 for the submitted data. In other words, job data is registered in the work flow control unit 707 in accordance with the submission data, and a print job is generated in the printing company system 100. In the system according to the present embodiment, it is necessary to create and transmit PQX that is a quality report corresponding to designated PRX. Therefore, after the process of registering a job ends in S722, the submission system unit 706 provides a PQX creation instruction to the work flow control unit 707.

All the preparations for the start of production are completed at the stage at which the above step ends (S724). Therefore, in S725, the submission system unit 706 provides an instruction to start production, that is, a process of executing a job, to the work flow control unit 707. The work flow control unit 707 generates a print job for a print control unit 708 that is a component of the image forming apparatus 104 (S726).

When the print job is generated in S726, a further process is executed in the system in the present embodiment. In other words, the controller unit 205 runs the work flow control program 505 that is the work flow control unit 707, and analyzes PRX data received in S721. As a result of analysis, information on a delivery form, included in the PRX data, is determined. In other words, it is determined in accordance with PRX whether the delivery form is roll finishing or cut finishing. As a result of determination, the work flow control unit 707 executes a process of providing an instruction to the print control unit 708 on a selected unit of designation of an inspection point on a sheet during quality inspection, included in PQX information. More specifically, when the delivery form is roll finishing, the work flow control unit 707 provides an instruction to create such a report that the unit of designation of an inspection point at the time of inspection is the length from the leading edge of roll paper. Or when the delivery form is cut finishing, the work flow control unit 707 provides an instruction to create such a report that the unit of designation of an inspection point at the time of inspection is the number of accumulated sheets accumulated from the start of production, that is, the start of the job. A method of expressing process details and an inspection point on a method of designating a product inspection point based on a delivery form, performed in S726, will be described later.

Upon receiving the instruction of S726, the print control unit 708 starts a print process. Then, in S727, the inspection unit 214 of the image forming apparatus 104 performs inspection on the produced product. The inspection result is returned to the work flow control unit in S728, the work flow control unit 707 converts the returned inspection result into PQX format and stores the inspection result in the web server unit 705. The details of information the inspection unit 214 returns to the work flow control unit 707 in S728 and the details of a process of creating information to be returned will be described later.

This is a series of operation flows related to production by the printing company system 100 for data submitted from the customer system 109 and a process of creating PQX that is the required quality report information.

In S730, the user executes a process of acquiring PQX data to check a quality situation during production for submitted data. In other words, the user accesses the web browser unit 704 and inputs information, such as necessary URL, to acquire PQX information. In S731, an http request is transmitted from the web browser unit 704 to the web server unit 705, and corresponding response information is returned in S732. In S733, the user operates the web screen returned in S732 and provides an instruction to the web browser unit 704 to acquire quality report information, that is, PQX. An http request is transmitted to the web server unit 705 (S734), and PQX information is transmitted to the user as its response.

Figure 8:
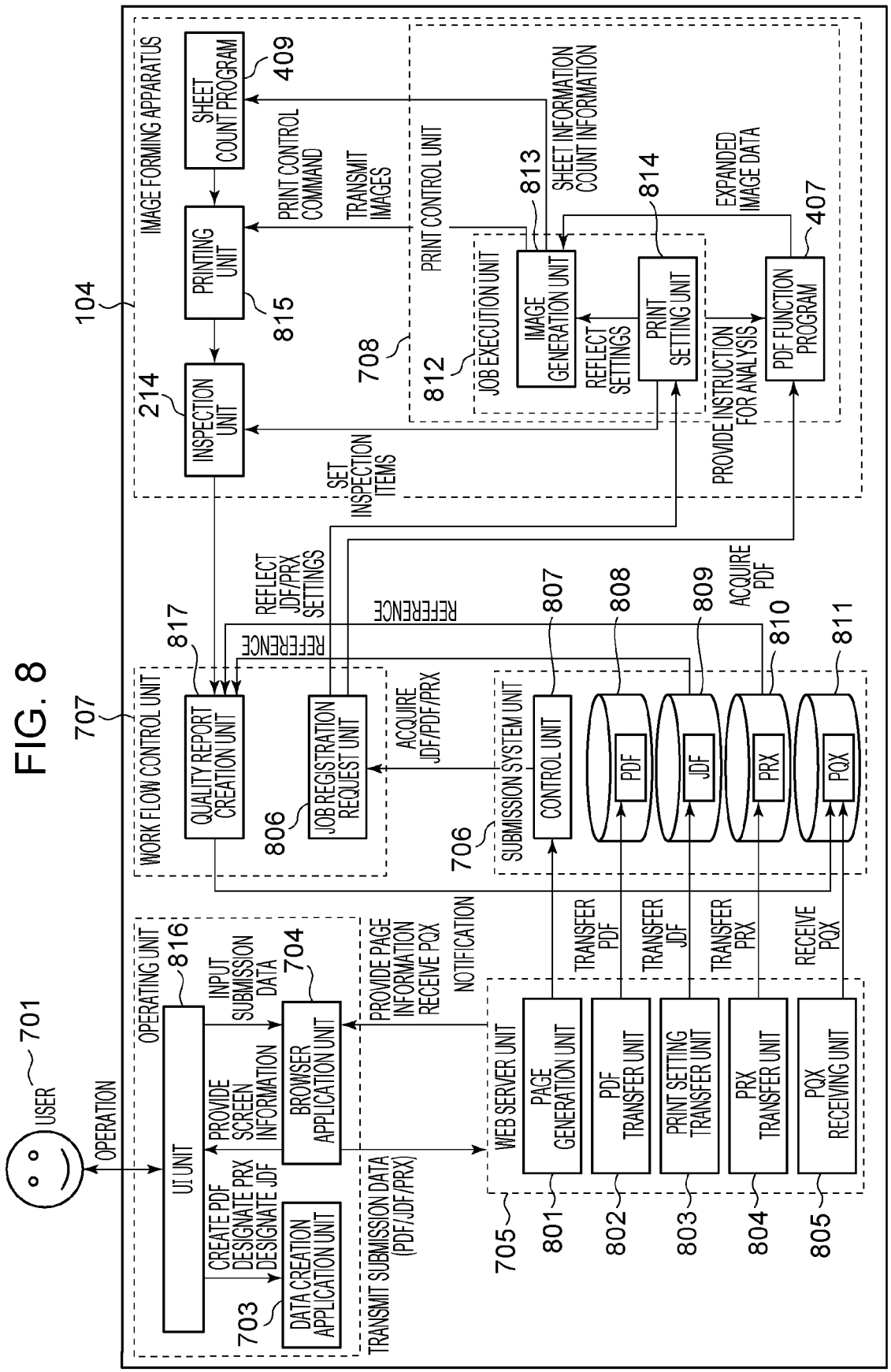
FIG. 8 is a detailed block diagram of the system configuration of the entire print processing system in the first embodiment.

FIG. 8 is a system configuration diagram showing a relationship among processes in charge and functions of functional modules made up of the customer system 109 and the printing company system 100 that make up the system and the user that is the operator. Hereinafter, the details of the units will be described.

A UI unit 816 is a functional unit provided to provide a means of displaying image information and receiving a data input and output instruction and an operation instruction. An instruction is provided from the UI unit 816 to the data creation application unit 703 and the browser application unit 704.

The data creation application unit 703 is to provide the user with a function to create pieces of data of JDF, PDF, and PRX.

The browser application unit 704 is a functional unit that governs a process of presenting screen information by displaying a web content on a window screen displayed on the UI unit 816. The browser application unit 704 executes a process of transmitting and receiving information to and from the web server unit 705 (described later) to execute various data processing, including presentation of various pieces of screen information and transmission of print target data. A series of functions of submission and quality requirements and report between the customer system 109 and the printing company system 100 is provided to the user.

The web server unit 705 is a functional unit of the information processing apparatus 102 in the printing company system 100 and is a functional unit that provides a web service to an external apparatus. The web server unit 705 executes a series of processes of receiving various requests from an external apparatus, that is, a request, and returning a result of executing a process according to the details to the outside in form of page information. A page generation unit 801 has a role in generating page information in accordance with the details of a request. It is also possible to provide an instruction to execute a submission process to the control unit 807 of the submission system unit 706.

A PDF transfer unit 802, a print setting transfer unit 803, and a PRX transfer unit 804 respectively execute a process of transferring PDF, JDF, PRX that are submission data transmitted from the browser application unit to storage means (808, 809, 810) provided by the submission system unit 706. A PRX receiving unit 805 executes a process of receiving PRX data (811) created by a quality report creation unit 817 (described later).

The submission system unit 706 is a functional unit of the information processing apparatus 102 in the printing company system 100 and is a functional unit that provides an external apparatus with a service related to a submission process. The control unit 807 requests a job registration request unit 806 of the work flow control unit 707 for pieces of submitted data (PDF 808, JDF 809, and PRX 810) and provides an instruction to execute a print job to the image forming apparatus 104.

The work flow control unit 707 is a functional unit of the information processing apparatus 102 in the printing company system 100 and is a functional unit for providing a work flow function. Under command of the work flow control unit 707, various apparatuses shown in FIG. 1 are connected via the network 101, and, under command of the work flow control unit 707, the operation of each of the apparatuses, an instruction to execute a job, and the like are performed, and the printing company system 100 operates as an integrated whole. The execution results of jobs having operated on the work flow control unit 707, the job registration request unit 806, and the apparatuses in the printing company system are obtained. The work flow control unit 707 includes a quality report creation unit 817 that generates PQX data that is quality report information from information on the quality of a produced product out of these execution results.

The image forming apparatus 104 is roughly divided into the print control unit 708, the sheet count program 409, a printing unit 815, and the inspection unit 214.

The print control unit further includes a job execution unit 812 and the PDF function program 407. The job execution unit is made up of an image generating unit 813 and a print setting unit 814. The print setting unit receives job data, that is, JDF 809, PDF 808, and PRX, transmitted from the job registration request unit 806 and provides an instruction for an image generating process to the image generating unit 813. The print setting unit also provides an instruction for a process of analyzing the received PDF 808 to the PDF function program 407.

At this time, control to create inspection information, executed by the inspection unit 214 in accordance with an instruction of information on delivery form, obtained as a result of analysis of PRX in the work flow control unit 707 is as described in S726 and S728 in FIG. 7.

The print setting unit 814 provides an instruction to the inspection unit 214 to perform inspection for quality requirements items of the PRX 810 required for a product produced. The PDF function program 407 transmits intermediate data (not shown) generated after analysis to the image generating unit 813 and executes the following image forming process. The image generating unit 813 provides an instruction for the size and count by type of sheets used in a print process to the sheet count program 409, and executes a process of forming an image of intermediate data (not shown) generated after analysis on the printing unit 815. The inspection unit 214 executes a process of inspecting an image on a sheet, generated by the printing unit 815, and registers the result in the quality report creation unit 817. When the inspection unit 214 transmits inspection result information to the quality report creation unit 817, a process of switching a designation method on a position on a sheet in report details, which is a subject of a quality report, is executed in accordance with an instruction of information on delivery form stored in PRX.

Figure 9A:
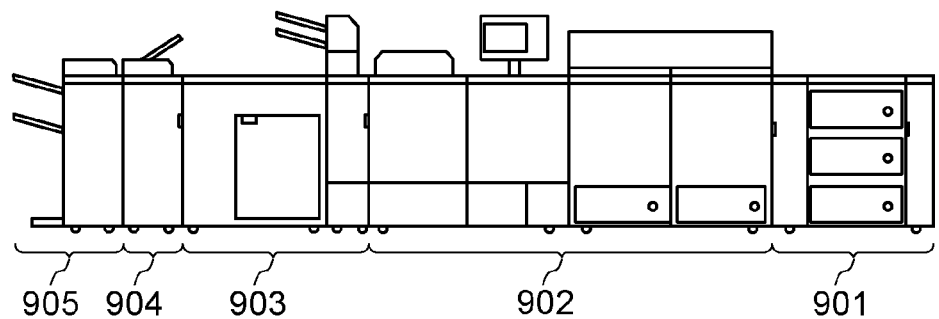
FIG. 9A is a view for illustrating the configuration and operation mechanism of an inspection apparatus of the image forming apparatus in the first embodiment.
Figure 9B:
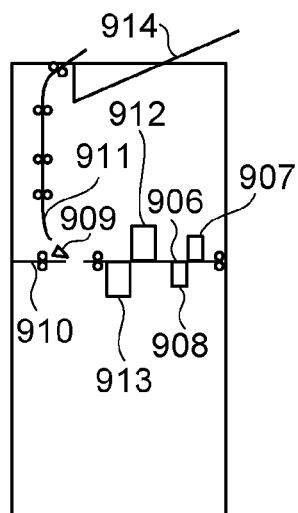
FIG. 9B is a view for illustrating the configuration and operation mechanism of the inspection apparatus of the image forming apparatus in the first embodiment.
Figure 9C:
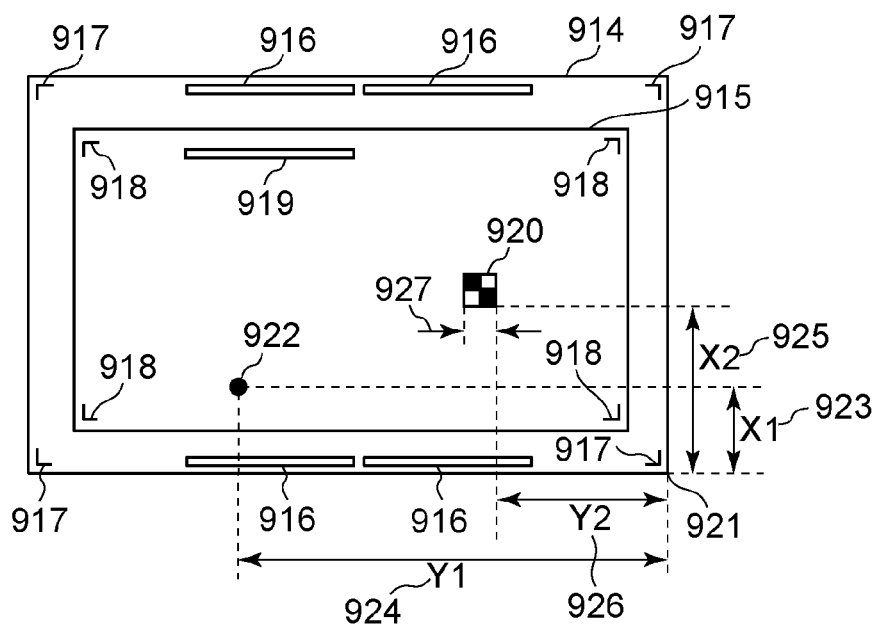
FIG. 9C is a view for illustrating the configuration and operation mechanism of the inspection apparatus of the image forming apparatus in the first embodiment.

FIGS. 9A to 9C are views for illustrating the configuration of an inspection apparatus and a method and mechanism of inspection performed by the inspection apparatus in the configuration of the image forming apparatus 104. FIG. 9A is a configuration view for illustrating the arrangement of modules making up the image forming apparatus 104, the connection, and the order relation of sheet conveying path. A sheet feeding unit 901 is installed in a form adjacent to the image forming unit 902. An intermediate processing unit 903 is connected in a form adjacent to the side across from the sheet feeding unit 901. For example, an inserter used to insert insertion paper to a specific location of a product during production, a cooling apparatus for cooling heat on a sheet, generated at the time when a fixing process is performed in the image forming unit 902, and the like correspond to the intermediate processing unit 903 An inspection unit 904 is installed downstream of the intermediate processing unit 903. The details of the configuration of the inspection unit 904 will be described later.

A post-processing unit 905 is further installed on the downstream end of the inspection unit 904. In the post-processing unit 905, printed sheets are subjected to processing, including a binding process, such as stapling, a perforating process, such as punching, and the like.

One example of the type, number, and connection order of constituent apparatuses that make up the image forming apparatus 104 shown in the drawing is shown; however, the configuration is not limited to the example shown in the drawing.

FIG. 9B is a configuration view for showing the internal configuration of the inspection unit 904. A printed sheet is conveyed from an apparatus corresponding to the one upstream of the inspection unit 904 to a conveying path 906. A first inspection means 907 and a second inspection means 908 for inspecting image information formed on a conveyed sheet are respectively placed above and below the sheet. This is a configuration to inspect images respectively formed on the front and back surfaces of a sheet at the same time. The first inspection means 907 and the second inspection means 908 in the present embodiment each are made up of a contact image sensor placed parallel to a main scanning direction for a sheet conveyed to the conveying path 906. Each of the first inspection means 907 and the second inspection means 908 each made up of the contact image sensor continuously reads an image on the sheet conveyed to the conveying path 906 in the main scanning direction in step with the conveying speed of the sheet and highly accurately acquires planar image information formed on a sheet. The first inspection means 907 and the second inspection means 908 are capable of detecting defects of an image, such as misregistration of an image and a stain, of image information formed on a sheet, and inspecting an image, such as the reading accuracy of a barcode.

A third inspection means 912 and a fourth inspection means 913 are further placed in the conveying path 906 downstream of the first inspection means 907 and the second inspection means 908. The third inspection means 912 and the fourth inspection means 913 each are a spectrophotometric colorimetry apparatus. The third inspection means 912 and the fourth inspection means 913, as well as the first inspection means 907 and the second inspection means 908, are respectively placed above and below the conveying path 906 so as to be capable of detecting the front and back surfaces of a sheet at the same time. The third inspection means 912 and the fourth inspection means 913 are intended to accurately inspect color information of an image at a specific point on a sheet conveyed to the conveying path 906.

A sheet having passed through the first to fourth inspection means (907, 908, 912, 913) is further conveyed in the following two-way directions depending on the position of a flapper 909. In other words, a sheet passes through a conveying path 910 and further conveyed to the post-processing unit 905 corresponding to a portion on the downstream end of the inspection unit 904. Alternatively, when a conveyed sheet is not part of a product but a sheet of collateral test print intended to check tint and an image condition, it is not a good idea to mix the sheet with a product. Therefore, the inspection unit 904 is also capable of controlling the position of the flapper 909 such that a sheet is conveyed to a conveying path 911 and guided to a discharge tray 914.

FIG. 9C is a view for illustrating an example of image information on a sheet used for inspection performed by the first to fourth inspection units (907, 908, 912, 913) of the inspection unit 904. Usages and purposes of image elements formed on a sheet will be described below.

Registration marks 917 are markers for inspecting whether an image is properly formed in a designated position on a sheet. This image information is read by the first inspection means 907 and the second inspection means 908. Even when registration marks 917 are not included as image information 915 of PDF data submitted by PRX, the image forming apparatus 104 is capable of forming an image by superposing registration marks on PDF data. Alternatively, registration marks can be included as image information in advance in submitted PDF data as in the case of second registration marks 918, and, in this case, the first inspection means 907 and the second inspection means 908 are capable of reading the registration marks 918 included in PDF data.

Color patches 916 are patch image portions for highly accurately reading color information at those points for an image at a designated position on a sheet with the third inspection means 912 and the fourth inspection means 913. Even when color patches 916, as in the case of the registration marks 917, are not included as image information 915 of PDF data submitted by PRX to the image forming apparatus 104, the image forming apparatus 104 is capable of forming an image by superposing registration marks on PDF data. Or a color patch, as in the case of a second color patch 919, may be included as image information in advance in submitted PDF data. In this case, the third inspection means 912 and the fourth inspection means 913 are capable of reading the color patch 919 included in PDF data.

A barcode 920 represents an area in which a barcode image forming part of the image of a product is printed. As shown in the drawing, the position of a barcode is designated by relative coordinates (X2(925), Y2(926)) designated with respect to the origin coordinates 921 of a sheet and the size 927 of an image. Therefore, the first inspection means 907 or the second inspection means 908 is capable of reading and inspecting image information of the barcode 920 with a contact image sensor. An image defect 922 is not included in image information 915 of submitted PDF data and represents a defective image part produced by a defect of the image forming apparatus 104 or a sheet. The image defect 922 is also able to be detected by the first inspection means 907 and the second inspection means 908, and the position of a detected defect is able to be acquired as relative coordinates (X1(923), Y1(924)) from the origin 921.

The configuration of the inspection apparatus shown in FIGS. 9A to 9C mainly shows a configuration in which the inspection apparatus is installed in the cut sheet image forming apparatus 104; however, an inspection apparatus may be configured as part of the image forming apparatus by similar configuration and mechanism in the continuous form sheet image forming apparatus 103 as well. The detailed description of the configuration of the inspection apparatus of the continuous form sheet image forming apparatus 103 is omitted.

Figure 10A:
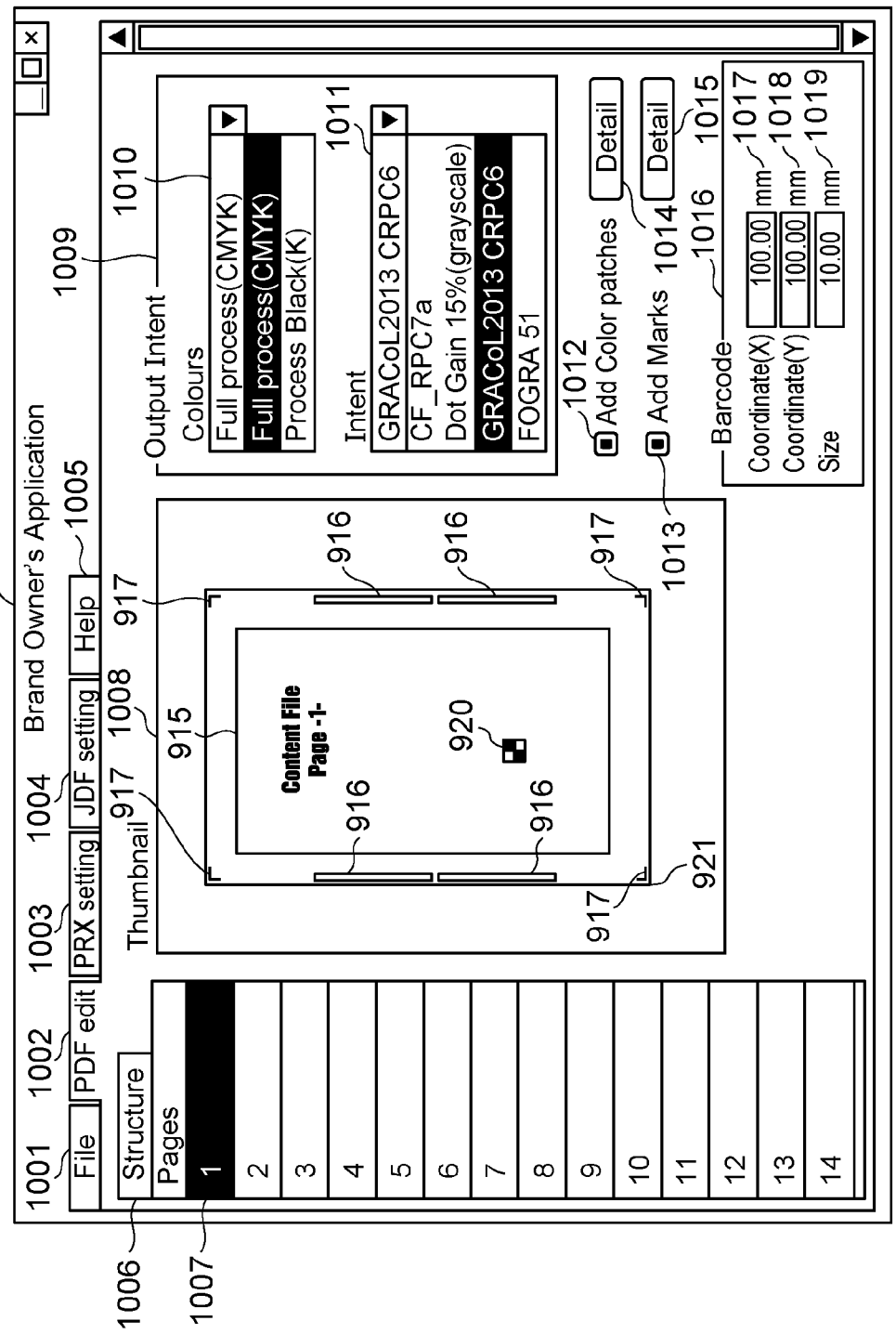
FIG. 10A is a first view for illustrating the operating unit of the application system in the first embodiment.
Figure 10B:
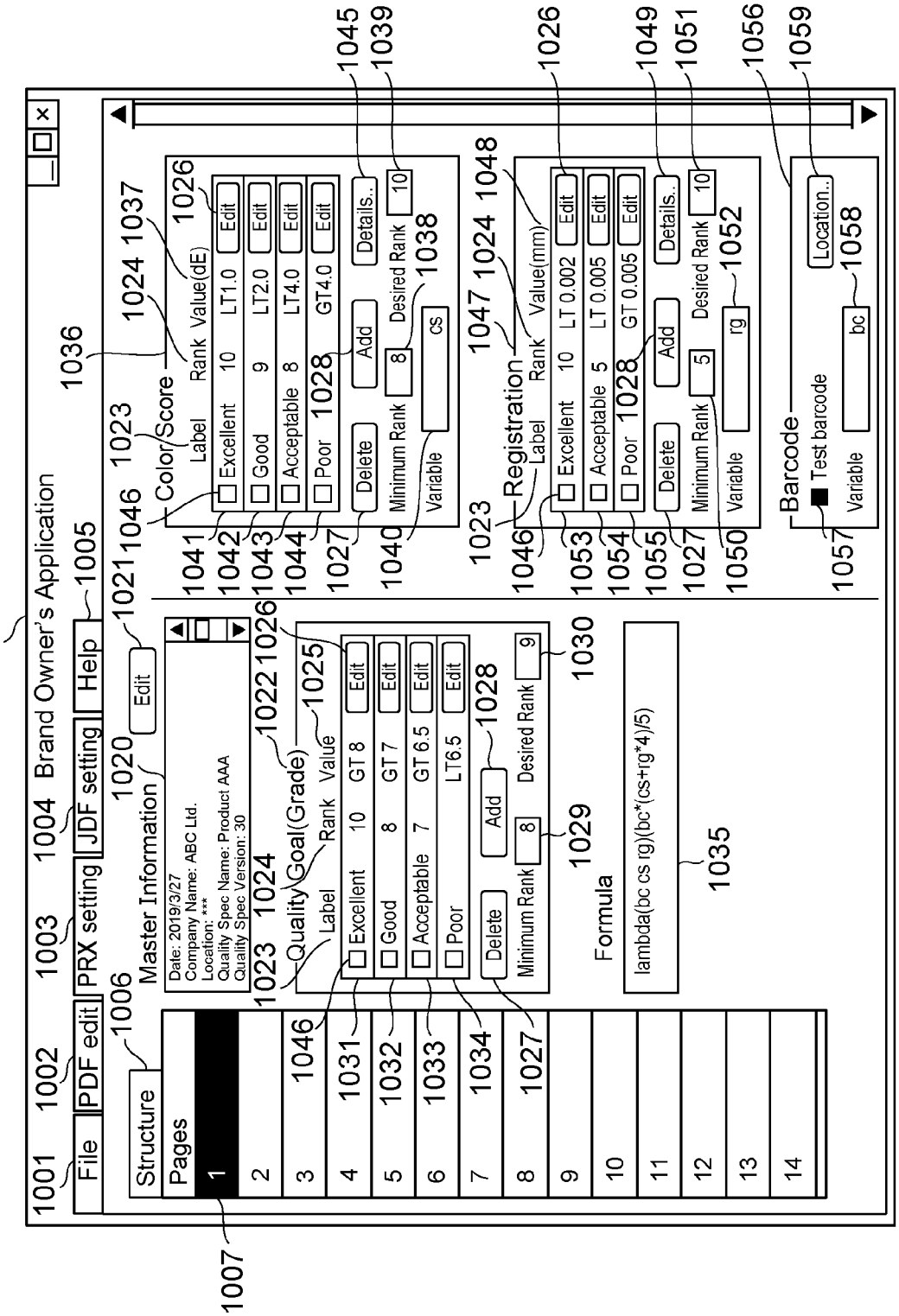
FIG. 10B is a first view for illustrating the operating unit of the application system in the first embodiment.

FIGS. 10A to 10C are views for illustrating the configuration of a screen for creating submission data, used by a customer, in the information processing apparatus 110 in the customer system 109.

FIG. 10A shows an example of an application screen for creating or editing PDF that is image data to be submitted in the information processing apparatus 110 in the customer system 109. An application of the present embodiment is shown as an example of an application in a mode in which the same application provides functions of the application for multiple purposes in parallel and the functions are selectively used by function tabs. Therefore, a general-purpose function setting section 1001, a PDF edit section 1002, a PRX setting section 1003, a JDF setting section 1004, and a help function providing section 1005 are switched and used. These means are configured to be able to be operated by selecting an associated tab.

FIG. 10A is a view showing an example of a screen in a state where a PDF edit section 1002 is selected.

A page select section 1006 is an area to select a page to be set at the time when a print target product is composed of a plurality of pages and different quality requirements are set page by page. In the drawing, a state where the first page (1007) is selected is shown. In other words, an example of a case where quality requirements on the first page of print target image data are set is shown.

A thumbnail display area 1008 is a reference image display area for a user of the application shown in the drawing to perform various settings while visually checking image information of a page selected by the page select section 1006. The registration marks 917, the color patches 916, the barcode 920, and the like (shown in FIG. 9C), and quality conditions required by PRX (described later) are inspected in the printing company system 100, and, as a result, correspond to additional image information needed to generate PQX.

Registration marks 917 are set by a registration mark setting section 1013. When the registration mark setting section 1013 is used to provide an instruction to add registration marks to an image, the registration marks 917 are added to a setting target page of a PDF file. It is possible to add color patches 916 to a setting target page of a PDF file with a color patch setting section 1012.

A registration mark detail setting section 1015 and a color patch detail setting section 1014 are setting sections for setting detailed information, such as positions at the time when color patches 916 or registration marks 917 are added to an image. When, for example, these registration marks 917 or color patches 916 are superposed in an area of PDF image information 915, the original image is not obtained, so it is inconvenient. Therefore, the application in the present embodiment allows settings such that the positions of the color patches 916 or the registration marks 917 do not overlap the area of the PDF image information 915 and coordinates of the image position are adjustable by these means.

A barcode information designation section 1016 is a designation section to designate the position of a barcode image corresponding part, included in the PDF image information 915. In other words, the barcode information designation section 1016 is made up of an X coordinate input section 1017 and a Y coordinate input section 1018 that indicate a position from the origin 921, at which a barcode is placed, and size information input section 1019 of the barcode image part.

An output intent setting section 1009 is a setting section for output intent information, implemented by a PDF edit function. The output intent setting section 1009 is made up of an image formation process information setting section 1010 used by an image forming means applied during production and a color intent setting section 1011 applied to an image produced. These pieces of output intent information are configured to be able to be individually set page by page in combination with the page select section 1006.

FIG. 10B is a view showing an example of an application screen for creating or editing PRX that is quality requirements data to be submitted in the information processing apparatus 110 in the customer system 109. When the PRX setting section 1003 is selected, display control of the screen shown in the drawing is executed. As in the case of the PDF edit section 1002 shown in FIG. 10A, the PRX setting section 1003 allows setting of PRX for each of the pages to be printed. For this reason, a page select section 1006 is provided, and, in the example shown in the drawing, an example of the screen in a state where the first page (1007) is selected is shown.

A master information setting section 1020 is a setting section to input various master information needed at the time of creating PRX. Master information corresponds to various pieces of information including a date and company information required by the specifications of PRX, a name given to requirements specifications defined by PRX, and the like. These pieces of information are able to be edited by depressing a master information edit section 1021.

An integrated quality target setting section 1022 is a setting section for integrating at least one or more different types of quality requirements designated by PRX and defining an integrated quality level. Integrated quality is determined according to the following regulations. Integrated quality is defined by a combination of a label 1023 that is readable information given to a quality level, a rank 1024 that is quantitative numeric value information corresponding to the label 1023, a value 1025 that defines a parameter and an expression for determining the rank 1024.

Specifically, details will be described below by using top-level quality 1031 as an example. The label of the top-level quality 1031 is defined as "Excellent". Strings applied to these labels 1023 are able to be optionally set by the user who uses the application shown in the drawing, operating on the information processing apparatus 110 in the customer system 109, that is, a customer. In other words, those strings are information provided in order for an operator to be able to easily determine the meaning of defined quality level and have properties different from information used in control and the like.

On the other hand, the value of the rank 1024 of the top-level quality 1031 is defined as 10. This is a numeric value defined by a customer in order to quantitatively determine and manage the quality of a product for which the customer makes a request of a printing company and is information intended to be used in control and the like. However, the numeric value itself of the rank 1024 is able to be optionally defined by the customer as a quantitative numeric value of the quality of a product of its own.

An example in which a value 1025 for defining the rank 1024 of the top-level quality 1031 is "GT 8" is shown in the drawing. In other words, when the numeric value of a quantitative quality index, calculated by a mathematical expression setting section 1035 (described later), is greater than or equal to eight, the rank 1024 of the top-level quality 1031 is calculated as 10, and the quality of the product is determined as top-level quality.

The other quality levels are also defined such that the ranks and the labels "Good" 1032, "Acceptable" 1033, and "Poor" 1034, are uniquely determined according to similar numeric values and values calculated from the mathematical expression. For the quality levels, a configuration that information defined by a quality level edit section 1026 can be edited is adopted in the present embodiment.

The number of quality levels can be set optionally. Where necessary, when more detailed levels are designated, a new quality level is able to be added to the integrated quality target setting section 1022 by depressing a level add section 1028. In addition, levels with a checkmark 1046 are able to be deleted with a level delete section 1027.

When a customer provides quality requirements to a printing company, the customer defines acceptable conditions depending on the numeric value of the rank 1024 defined by the quality level for the quality of a produced product. The acceptable conditions are defined by using a minimum acceptable quality setting section 1029 and a desired quality setting section 1030.

The minimum acceptable quality setting section 1029 is used for a customer to define acceptable quality, that is, the minimum value of the rank 1024, at the time of delivery of a product for a printing company. In other words, it is possible to communicate quality requirements to a printing company that a product with a numeric value of the rank 1024 below the numeric value defined in the minimum acceptable quality setting section 1029, that is, eight in the example of the drawing, does not satisfy acceptable quality.

The desired quality setting section 1030 is used for a customer to define desired quality conditions, that is, the desired value of the rank 1024, at the time of delivery of a product for a printing company. In other words, it is possible to communicate a product with a numeric value of the rank 1024 above the numeric value defined in the desired quality setting section 1030, that is, nine in the example of the drawing, as quality requirements to a printing company.

A color quality setting section 1036 is a setting section to, at the time of creating PRX, input quality requirements information on the color of a product. As in the case of the integrated quality target setting section 1022, the color quality setting section 1036 is configured to be able to designate the level of quality requirements on color with a means to set the label 1023 and the rank 1024.

A color quality value 1037 defines a color difference (also referred to as AE or delta E) of a color value that is a measurement result of a product for a required color as a reference. In other words, an example in which top-level quality 1041 in color quality is less than or equal to a color difference of 1.0 is shown. In other words, the drawing shows an example in which the label 1023 in the case of the top-level quality 1041 is "Excellent" and the rank is 10. Similarly, the drawing shows an example in which "Good" 1042, "Acceptable" 1043, and "Poor" 1044 in color quality are similarly defined. A function to add and delete a rank is implemented by a mechanism similar to the integrated quality target setting section 1022, so the description is omitted.

The color quality setting section 1036 also defines acceptable conditions depending on the numeric value of the rank 1024 defined by the quality level for color quality of a produced product at the time when a customer provides quality requirements on color to a printing company. Acceptable conditions are defined by a minimum acceptable color quality setting section 1038 and a desired color quality setting section 1039 on color quality.

The minimum acceptable color quality setting section 1038 is used for a customer to define acceptable color quality, that is, the minimum value of the rank 1024, at the time of delivery of a product for a printing company. In other words, it is possible to communicate color quality requirements to a printing company that a product with a numeric value of the rank 1024 below the numeric value defined in the minimum acceptable color quality setting section 1038, that is, eight in the example of the drawing, does not satisfy acceptable color quality.

The desired color quality setting section 1039 is used for a customer to define desired color quality conditions, that is, the desired value of the rank 1024, at the time of delivery of a product for a printing company. In other words, it is possible to communicate, to a printing company, color quality requirements on a product with a numeric value of the rank 1024 above the numeric value defined in the desired color quality setting section 1039, that is, 10 in the example of the drawing.

A color quality variable setting section 1040 is a means provided to define a variable for referencing the value of the rank 1024 on the above-described color quality from the mathematical expression setting section 1035 for calculating a value 1025 in the integrated quality target setting section 1022. The mathematical expression setting section will be described later. In the present embodiment, an example in which the color quality variable setting section 1040 allows the value of the rank 1024 on color quality to be referenced with the variable "cs" is described.

The image misregistration quality setting section 1047 is a setting section to input quality requirements information on image misregistration of a product at the time of creating PRX. As in the case of the integrated quality target setting section 1022, the image misregistration quality setting section 1047 is configured to be able to designate the level of quality requirements on image misregistration with a means to set the label 1023 and the rank 1024.

An image misregistration quality value 1048 is defined with reference to a deviation (length or a distance between a reference image and an image of a product) from a reference position that is a measurement result of a product with respect to a required image misregistration. In other words, an example in which top-level quality 1053 in image misregistration quality is less than or equal to a deviation of 0.002 mm is shown. In other words, the drawing shows an example in which the label 1023 in the case of the top-level quality 1053 is "Excellent" and the rank is 10. Similarly, the drawing shows an example in which "Good" 1054 and "Poor" 1055 in image misregistration quality are similarly defined. A function to add and delete a rank is implemented by a mechanism similar to the integrated quality target setting section 1022, so the description is omitted.

The image misregistration quality setting section 1047 also defines acceptable conditions depending on the numeric value of the rank 1024 defined by the quality level for image misregistration quality of a produced product at the time when a customer provides quality requirements on image misregistration to a printing company. Acceptable conditions are defined by a minimum acceptable image misregistration quality setting section 1050 and a desired image misregistration quality setting section 1051 on image misregistration quality.

A minimum acceptable image misregistration quality setting section 1050 is a setting section with which a customer defines acceptable image misregistration quality, that is, the minimum value of the rank 1024, at the time of delivery of a product for a printing company. Image misregistration quality requirements that a product with a numeric value of the rank 1024 below the numeric value defined by the minimum acceptable image misregistration quality setting section 1050, that is, five in the example of the drawing, does not satisfy acceptable image misregistration quality are communicated to a printing company.

A desired image misregistration quality setting section 1051 is a setting section with which a customer defines desired image misregistration quality conditions, that is, the desired value of the rank 1024, at the time of delivery of a product for a printing company. It is possible to communicate, to a printing company, image misregistration quality requirements on a product with a numeric value of the rank 1024 above the numeric value defined in the desired image misregistration quality setting section 1051, that is, 10 in the example of the drawing.

An image misregistration quality variable setting section 1052 is a setting section provided to define a variable for referencing the value of the rank 1024 on image misregistration quality from the mathematical expression setting section 1035 for calculating a value 1025 in the integrated quality target setting section 1022. The mathematical expression setting section 1035 will be described later. In the present embodiment, an example in which the image misregistration quality variable setting section 1052 allows the value of the rank 1024 on image misregistration quality to be referenced with the variable "rg" is described.

A barcode reading quality setting section 1056 is a setting section to input quality requirements information on the reading accuracy of a barcode image included in a print target image at the time of creating PRX. Here, the barcode reading quality setting section 1056 sets information different from the integrated quality target setting section 1022. For barcode reading quality, different from color quality or image misregistration quality, information that becomes an index representing quality is not a physical quantity but whether barcode information is readable or not readable. Whether it is possible to perform inspection on barcode quality is controlled not by designation of the rank 1024 but by a barcode quality reading instruction setting section 1057. A barcode position information setting section 1059 is a setting section to designate the position of a barcode to be inspected in an image by coordinates.

The barcode reading quality setting section 1056 defines a variable for referencing an evaluation value on barcode reading quality from the mathematical expression setting section 1035 for calculating the value 1025 in the integrated quality target setting section 1022. The barcode reading quality setting section 1056 allows the evaluation value on barcode reading quality to be referenced with the variable "bc". Here, the evaluation value of barcode reading quality is calculated as "1" when a barcode is readable, and the evaluation value is calculated as "0" when a barcode is not readable. The mathematical expression setting section 1035 integrates inspection results of the color quality setting section 1036, image misregistration quality setting section 1047, and barcode reading quality setting section 1056 and defines a mathematical expression for deriving the integrated quality target setting section 1022. Specifically, the mathematical expression setting section 1035 stores a mathematical expression for deriving the value 1025 of the integrated quality target setting section 1022 from the values stored in these variables in the color quality variable setting section 1040, the image misregistration quality variable setting section 1052, and the barcode reading quality setting section 1056.

Various means are applied as a method of expressing the mathematical expression. Here, a calculation formula is expressed by a lambda expression. In another mode, an unnamed function is expressed by the format of a selected programming language or script language. Or it is not limited to a function, a mode in which a programming language or a script language may be directly described and the application program obtains the value of the result of running the programming language or script language may be taken. In addition, there is a method in which a mathematical expression is defined by another means, a name is assigned to the mathematical expression, and the name is set in the mathematical expression setting section 1035.

Hereinafter, process details in the case where the value 1025 in the integrated quality target setting section 1022 is derived by the mathematical expression setting section 1035 will be described by using a specific example. Inspection results of the color quality setting section 1036, the image misregistration quality setting section 1047, and the barcode reading quality setting section 1056 are obtained. It is assumed that, quality data included in PQX created by the image forming apparatus 104 and the work flow control program 505 in accordance with a reference set in PRX according to the inspection results is as follows. However, a PQX creation process will be described later.

EXAMPLE

Color quality measured value (delta E): 1.5 (cs=9) Image misregistration quality measured value (mm): 0.002 (rg=10) Barcode reading quality measured value (reading successful or failed): Successful (bc=1)

When the above values are applied to the mathematical expression set in the mathematical expression setting section 1035 described in the present embodiment according to the present invention, an evaluation value is calculated as follows.

$$bc*(cs + rg*4)/5 = 1*(9 + 10*4)/5 = 9.8$$

In other words, the value 1025 in the integrated quality target setting section 1022 is 9.8, the rank 1024 of top-level quality of which the rank 1024 is 10, that is, the label is "Excellent", is derived.

FIG. 10C is a view showing an example of an application screen for creating or editing job ticket, that is, JDF data, that is print setting information to be submitted in the information processing apparatus 110 in the customer system 109. When the JDF setting section 1004 is selected, display control of the screen shown in the drawing is executed. The system in the present embodiment is configured such that the JDF setting section 1004 allows selection of further detailed setting items as shown in the drawing. In other words, for functions to be set, there are a general setting section 1060, a media setting section 1061, an imposition setting section 1062, an insertion paper setting section 1063, an image processing setting section 1064, a post-processing setting section 1065, and the like. The example of the screen shown in the drawing shows an example of a display state of a screen in the case where the media setting section 1061 is selected.

As shown in the drawing, the media setting section 1061 is made up of a global job media setting section 1066 and a partition job media setting section 1068. The global job media setting section 1066 is provided to select a piece of media used in a job. In other words, the example shown in the drawing shows a state where "Media1" is selected in a global job media species select section 1067. In other words, it means that, in executing a print process with this JDF, a piece of media used during printing is set to "Media1". On the other hand, the partition job media setting section 1068 is a setting means to be used in the case where a piece of media different from a piece of media set in the global job media setting section 1066 is set for a specific page or page range. In the example shown in the drawing, the partition job media setting section 1068 provides a means to create and delete a page range to be set with a page range add section 1069, checkboxes 1046, and a page range delete section 1070, to be set.

In the drawing, a state where two page ranges are created is shown. In other words, in a first page range setting section 1071, page 5, page 200 to page 210, and page 250 are targets to be set in a first page range 1073. An example in which a piece of media to be used for pages to be set to "Media2 (coated)" in a first partition media select section 1074 is shown. In a second page range setting section 1072, page one is a target to be set in a second page range 1075. An example in which a piece of media to be used for pages to be set to "Media3(cardboard)" in a second partition media select section 1076 is shown.

Figure 11A:
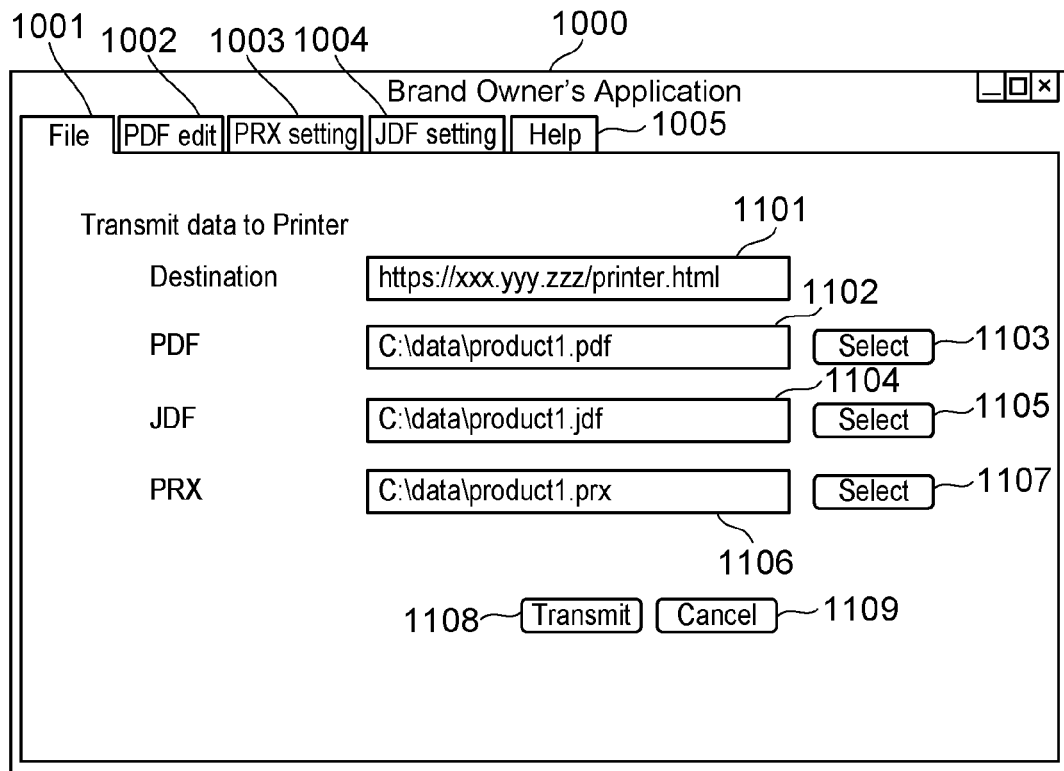
FIG. 11A is a second view for illustrating an operating unit of an application system that operates on the information processing apparatus in the customer system in the first embodiment.
Figure 11B:
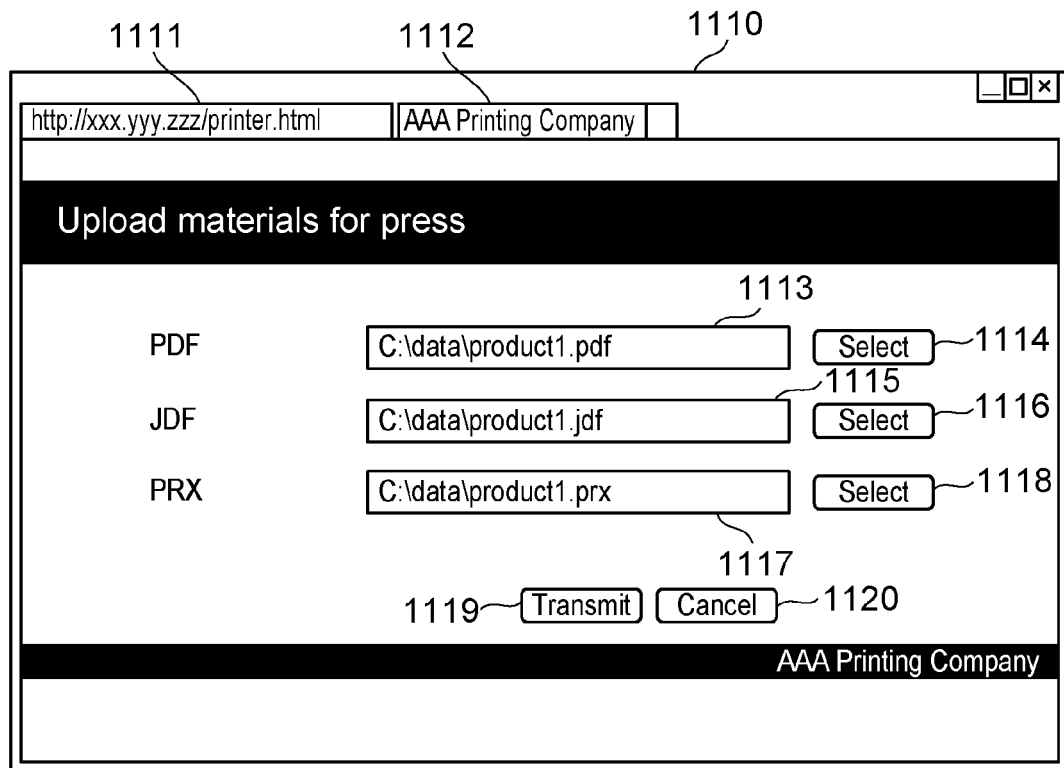
FIG. 11B is a second view for illustrating an operating unit of an application system that operates on the information processing apparatus in the customer system in the first embodiment.

FIGS. 11A and 11B are views each showing an example of an application screen at the time of executing a process of submitting PRX that is quality requirements data, JDF, and PDF, to be submitted, in the information processing apparatus 110 in the customer system 109 to the printing company system 100.

FIG. 11A is a view showing an example of a screen 1000 in the case of a mode of providing a function to transmit submission data to the printing company system 100 as part of the function of the application shown in FIGS. 10A to 10D. In other words, the system of the present embodiment according to the present invention is configured such that the screen shown in the drawing is displayed at the time when the general-purpose function setting section 1001 is selected.

A transmission destination information setting section 1101 is a designation section to designate the address of the web service provided as a submission means by the web server 504 operating on the information processing apparatus 102 in the printing company system 100. A first PDF file select section 1102 and a first PDF file select instruction section 1103 both are to select a PDF file that is image data to be submitted from a file system included in the information processing apparatus 110 in the customer system 109. A first JDF file select section 1104 and a first JDF file select instruction section 1105 are to select a JDF file that is job setting data to be submitted from a file system included in the information processing apparatus 110 in the customer system 109. A first PRX file select section 1106 and a first PRX file select instruction section 1107 are to select a PRX file that is quality requirements data to be submitted from a file system included in the information processing apparatus 110 in the customer system 109. When a first transmission instruction section 1108 is selected in a state where a data set needed for submission is selected and appropriate transmission destination information is set, the submission data set is transmitted to the printing company system 100. A first process cancellation instruction section 1109 is an instruction section for cancelling a submission process itself.

FIG. 11B is a view for illustrating a display state of the screen in the case where a function equivalent to the submission instruction means by the application shown in FIG. 11A is provided by an operation means of a web browser.

Transmission destination information is input to an address input section 1111 of the web browser, and the web server 504 operating on the information processing apparatus 102 in the printing company system 100 accesses the address of the web service provided as a submission means. As a result of the access, the screen shifts into a state of a submission web screen as shown in the drawing (1110, 1112).

As shown in the drawing, select means having functions equivalent to the file select means shown in FIG. 11A are provided as the screen of a web browser. In other words, a second PDF file select section 1113 and a second PDF file select instruction section 1114 correspond to the functions of the first PDF file select section 1102 and the first PDF file select instruction section 1103.

A second JDF file select section 1115 and a second JDF file select instruction section 1116 correspond to the functions of the first JDF file select section 1104 and the first JDF file select instruction section 1105.

A second PRX file select section 1117 and a second PRX file select instruction section 1118 correspond to the functions of the first PRX file select section 1106 and the first PRX file select instruction section 1107.

A second transmission instruction section 1119 corresponds to the function of the first transmission instruction section 1108. A second process cancellation instruction section 1120 corresponds to the function of the first process cancellation instruction section 1109.

The description of the functions equivalent to the means shown in FIG. 11B has been described with reference to FIG. 11A, so the description of the functions is omitted.

FIGS. 12A to 12D are views for showing an example of various pieces of submission target data generated as the result that a customer operates by using the operation means shown in FIGS. 10A to 10C. Hereinafter, details will be described for each data type.

FIG. 12A is an example of job ticket in JDF format, generated with FIG. 10C, that is, a means of creating or editing JDF data that is job ticket that is print setting information, to be submitted, in the information processing apparatus 110 in the customer system 109.

Job ticket includes information as follows. In other words, Job ticket includes the number of pages (1201) included in a copy, global job print parameters 1202, and partition job print parameters (1206, 1208).

The global job print parameters 1202 include a total number of copies printed 1203, information on lot 1287, and a media setting 1204 used in a global job. The lot 1287 is a parcel of articles a printing company delivers produced products to a customer. In the example shown in the drawing, a state where a printing company provides an instruction to send and deliver 1000 copies of products each composed of 13 pages is shown. The partition job print parameters (1206, 1208) include page range information (1205, 1209) designated as a partition, and a media setting (1207, 1210) used as a partition.

Actual details of settings of the media setting 1204 used in a global job and the media settings (1207, 1210) used in part of a job are defined in media tags (1211, 1214, 1217). The media tags (1211, 1214, 1217) further include setting information including media types (1213, 1216, 1219), media sizes (1212, 1215, 1218), and the like.

FIG. 12B is a view showing an example of PRX data generated with FIG. 10B, that is, a means to create or edit PRX that is quality requirements data, to be submitted, in the information processing apparatus 110 in the customer system 109. PRX data includes information as follows. In other words, the PRX data includes master information 1220 and integrated quality target setting information 1221.

The integrated quality target setting information 1221 further includes quality level defining sections (1222, 1223, 1224, 1225), a mathematical expression defining section 1226, minimum acceptable quality setting information 1227, desired quality setting information 1228, and the like. The meanings of pieces of information equivalent to these have been described with reference to FIG. 10B, so the description is omitted.

A color quality information defining section 1229 is made up of pieces of information that store various pieces of setting information on color quality of a product. In other words, the color quality information defining section 1229 includes a unit information defining section 1231 for defining a color difference that is color quality, a reference color information defining section 1232 that is color information to be a reference, defining sections (1233, 1234, 1235, 1236) for respective color quality levels, and the like. The color quality information defining section 1229 further includes minimum acceptable color quality setting information 1237, desired color quality setting information 1238, color quality variable setting information 1239, color quality measurement coordinate information 1240, and the like. The meanings of pieces of information equivalent to these have been described with reference to FIG. 10B, so the description is omitted.

An image misregistration quality information defining section 1241 is composed of information that stores various pieces of setting information on image misregistration quality of a product. In other words, the image misregistration quality information defining section 1241 includes a unit information defining section 1242 for defining an allowable deviation that is image misregistration quality, defining sections (1243, 1244, 1245) for image misregistration quality levels, and the like. The image misregistration quality information defining section 1241 also includes minimum acceptable color image misregistration setting information 1246, desired image misregistration quality setting information 1247, image misregistration quality variable setting information 1248, image misregistration quality measurement coordinate information 1249, and the like. The meanings of pieces of information equivalent to these have been described with reference to FIG. 10B, so the description is omitted.

A barcode reading quality defining section 1250 is provided to store quality requirements information on the reading accuracy of a barcode image included in a product. The barcode reading quality defining section 1250 includes a barcode reading quality information defining section (1251, 1252), a barcode reading quality setting defining section 1255, a barcode reading minimum quality defining section 1253, a barcode reading desired quality defining section 1254, and a barcode reading target coordinate defining section 1256. The meanings of pieces of information equivalent to these have been described with reference to FIG. 10B, so the description is omitted.

A reference color detailed information defining section 1257 is provided to define reference data (a correct value and a reference value) desired as color quality. The reference color detailed information defining section 1257 includes a CXF information defining section 1258 and an optical spectrum information storage section 1259 that is one of a means of expressing color information, included in the CXF information defining section 1258, as a specific example in the present embodiment.

An area storing information added to PRX in an extended information storage section 1260 may be optionally used. In the present embodiment, when a customer makes a request of a printing company for production, a delivery form of the product is designated or instructed. In the example shown in the drawing, information indicating that a product is delivered as cut sheets is stored in the delivery form designation section 1261. In other words, a printing company that has received the PRX is instructed to produce a product by using submitted data and further eventually delivers a product in a cut sheet form at the time of delivery.

FIG. 12C is a view for illustrating an example of inspection result data at the time when the inspection unit 214 of the image forming apparatus 103 or the image forming apparatus 104 performs inspection on image information formed on a sheet that is a product. Information shown in the drawing is created by the controller unit 205 running an inspection program 410 provided in the image forming apparatus 103 or the image forming apparatus 104, and is transmitted to the work flow control program 505 that operates on the information processing apparatus 102. Hereinafter, pieces of information contained in inspection result data will be described.

Inspection execution sheet information 1262 is provided for the purpose of storing information on the number of sheets from the beginning of a job at the time when the inspection unit 214 of the cut sheet image forming apparatus 104 performs inspection. The inspection execution sheet information 1262 is information for the purpose of being designated at the time when an instruction to deliver a product with cut sheet finishing is set in the delivery form designation section 1261 and production is performed by using the cut sheet image forming apparatus 104.

On the other hand, a sheet inspection position designation section 1263 is provided for the purpose of storing a position on a sheet from the leading edge of roll paper by length at the time when the inspection unit 214 of the continuous form sheet image forming apparatus 103 performs inspection. The sheet inspection position designation section 1263 is information for the purpose of being designated at the time when a product is delivered with rolled sheet finishing is set in the delivery form designation section 1261 and production is performed by using the continuous form sheet image forming apparatus 103.

In the example of the drawing, for the sake of convenience, a state where the inspection execution sheet information 1262 and the sheet inspection position designation section 1263 are included at the same time is shown; however, it is assumed that both are actually exclusively used according to a delivery form designated.

A delivery form does not always coincide with the type of the image forming apparatus used during production, and the present embodiment of the present invention also assumes the other case. In other words, this is the case where a print process is executed in the continuous form sheet image forming apparatus 103, cut sheet finishing is performed in a print process, and then delivered. In this case, it can be assumed that any one or both of the inspection execution sheet information 1262 and the inspection position designation section 1263 are stored. In this case, the work flow control unit 707 executes control such that information indicating an inspection position is stored in PQX in accordance with an appropriate mode according to a delivery form at the stage at which PQX is created in S728 and S729.

Optical spectrum data 1264 is numeric value data of an optical spectrum that is color information of an image on a sheet from the third inspection means 912 and the fourth inspection means 913 shown in FIG. 9B in the inspection unit 214. The optical spectrum data 1264 is stored in PQX data (described later) and used to provide a customer with an inspection result on color quality.

Image misregistration inspection result data 1265 is numeric value data of deviations on misregistration of an image on a sheet by the first inspection means 907 and the second inspection means 908 shown in FIG. 9B in the inspection unit 214. The image misregistration inspection result data 1265 is stored in PQX data (described later) and used to provide a customer with an inspection result on image misregistration quality.

Barcode reading inspection result data 1266 is data of the result of reading inspection on a barcode image on a sheet by the first inspection means 907 and the second inspection means 908 shown in FIG. 9B in the inspection unit 214. The barcode reading inspection result data 1266 is stored in PQX data (described later) and used to provide a customer with an inspection result on barcode reading quality.

FIG. 12D is a view showing print quality report data, that is, an example of PQX data, that is created by the work flow control program 505 receiving inspection information shown in FIG. 12C created by the inspection unit 214 of the image forming apparatus 103 or the image forming apparatus 104. Hereinafter, of pieces of information included in PQX, major ones will be described.

PQX header information 1267 is a storage area for main information that should be held by PQX data.

A work report storage section 1268 is used to store a quality inspection result made at the time when the image forming apparatus 103 or the image forming apparatus 104 executes a process, and general-purpose information associated with the quality inspection result. In the present embodiment, an example in which the work report storage section 1268 stores production conditions at the time of performing quality inspection is described. More specifically, the work report storage section 1268 stores roll delivery total sheet information 1270 when the delivery form is roll finishing or stores cut sheet delivery total sheet information 1269 when the delivery form is cut sheet finishing.

An inspection result storage area 1272 is a storage section provided for the purpose of recognizing results of various inspections on product creation quality, performed by the inspection unit 214, for each type of inspection and storing the inspection results. Hereinafter, details of a quality inspection result stored in the area will be described.

The inspection result storage area 1272 stores position information on the quality inspection result performed by the inspection unit 214 of the image forming apparatus 103 or the image forming apparatus 104. More specifically, the inspection result storage area 1272 stores roll delivery sheet information 1273 when the delivery form is roll finishing or stores cut sheet delivery sheet information 1274 when the delivery form is cut sheet finishing.

The roll delivery sheet information 1273 and the cut sheet delivery sheet information 1274 are intended to provide reference position information for identifying coordinates on a sheet at the time when various quality inspections are performed (described later). Specifically, when a product is delivered in roll finishing, position information based on the length from the leading edge of roll paper and a roll number are stored in the roll delivery sheet information 1273 at the time when a point at which quality inspection is performed is designated. When a product is delivered in cut sheet finishing, information on the number of sheets from the beginning of a job, on which an image is formed during the job for designating a point at which quality inspection is performed and information on a lot number at the time of delivery are stored.

A color quality report storage section 1275 is an area for storing report information on color information out of quality report information that is included in PQX and provided by a printing company to a customer. Information in the area is created in accordance with the optical spectrum data 1264 shown in FIG. 12C. In other words, the information in the area corresponds to a reference link 1276 of the optical spectrum data 1264, a practical optical spectrum data storage section 1285 and optical spectrum data 1286, referenced by the reference link 1276, and a measurement position designation section 1277.

Data stored in the optical spectrum data storage section 1285 from PQX received by the third receiving program 609 is compared with the color quality information defining section 1229 transmitted as PRX by the third transmission program 608, and a color difference (delta E) is calculated.

Then, a process of deriving the rank 1024 from the value 1037 defined in the color quality setting section 1036 in FIG. 10B is executed, and the rank 1024 is used to derive determination information on color quality.

The measurement position designation section 1277 is used in combination with the roll delivery sheet information 1273 or the cut sheet delivery sheet information 1274. Specifically, when the delivery form designated in PRX is roll finishing, the measurement position designation section 1277 is position information from the leading edge of a sheet indicated by the numeric value of the roll delivery sheet information 1273 indicating information on the accumulated length from the roll leading edge. The position information indicates a relative coordinate position of a color patch (916, 919) from the origin, stored in the measurement position designation section 1277. The image of the color patch (916, 919) is formed in main and sub coordinate directions, and the color patch (916, 919) is subjected to reading inspection with the third inspection means 912 and the fourth inspection means 913.

When the delivery form designated in PRX is cut finishing, the measurement position designation section 1277 is the number of sheets from the beginning of a job, indicated by the numeric value of the cut sheet delivery sheet information 1274, and position information in the last one of the sheets. The position information indicates a relative coordinate position of a color patch (916, 919) from the origin, stored in the measurement position designation section 1277. The image of the color patch (916, 919) is formed in main and sub coordinate directions, and the color patch (916, 919) is subjected to reading inspection with the third inspection means 912 and the fourth inspection means 913.

An image misregistration quality report storage section 1278 is an area for storing report information on image misregistration information out of quality report information that is included in PQX and provided by a printing company to a customer. Information on the area is created in accordance with the image misregistration inspection result data 1265 shown in FIG. 12C.

Data stored in the image misregistration quality report storage section 1278 from PQX received by the third receiving program 609 is compared with the image misregistration quality information defining section 1241 transmitted as PRX by the third transmission program 608, and a misalignment amount is calculated. Then, a process of deriving the rank 1024 from the value 1048 defined in the image misregistration quality setting section 1047 in FIG. 10B is executed, and the rank 1024 is used to derive determination information on image misregistration quality.

The measurement position designation section 1281 is used in combination with the roll delivery sheet information 1273 or the cut sheet delivery sheet information 1274. Specifically, when the delivery form designated in PRX is roll finishing, the measurement position designation section 1277 is position information from the leading edge of a sheet indicated by the numeric value of the roll delivery sheet information 1273 indicating information on the accumulated length from the roll leading edge. The position information indicates a relative coordinate position of a registration mark (917, 918) from the origin, stored in the measurement position designation section 1281. The image of the registration mark (917, 918) is formed in main and sub coordinate directions, and the registration mark (917, 918) is subjected to reading inspection with the first inspection means 907 and the second inspection means 908.

When the delivery form designated in PRX is cut finishing, the measurement position designation section 1277 is the number of sheets from the beginning of a job, indicated by the numeric value of the cut sheet delivery sheet information 1274, and position information in the last one of the sheets. The position information indicates a relative coordinate position of a registration mark (916, 919) from the origin, stored in the measurement position designation section 1281. The image of the registration mark (916, 919) is formed in main and sub coordinate directions, and the registration mark (916, 919) is subjected to reading inspection with the first inspection means 907 and the second inspection means 908.

A barcode reading quality storage section 1282 is an area for storing report information on barcode reading quality information out of quality report information that is included in PQX and provided by a printing company to a customer. Information on the area is created in accordance with the barcode reading inspection result data 1266 shown in FIG. 12C.

Data stored in the barcode reading quality storage section 1282 from PQX received by the third receiving program 609 is compared with the barcode reading quality defining section 1250 transmitted as PRX by the third transmission program 608, and an inspection result is calculated. Then, the inspection result is used to derive determination information on the inspection result on barcode reading quality defined in the barcode reading quality setting section 1056 in FIG. 10B.

The measurement position designation section 1284 is used in combination with the roll delivery sheet information 1273 or the cut sheet delivery sheet information 1274. Specifically, when the delivery form designated in PRX is roll finishing, the measurement position designation section 1277 is position information from the leading edge of a sheet indicated by the numeric value of the roll delivery sheet information 1273 indicating information on the accumulated length from the roll leading edge. The position information indicates a relative coordinate position of the barcode 920 from the origin, stored in the measurement position designation section 1284. The image of the barcode 920 is formed in main and sub coordinate directions, and the barcode 920 is subjected to reading inspection with the first inspection means 907 and the second inspection means 908.

When the delivery form designated in PRX is cut finishing, the measurement position designation section 1277 is the number of sheets from the beginning of a job, indicated by the numeric value of the cut sheet delivery sheet information 1274, and position information in the last one of the sheets. The position information indicates a relative coordinate position of the barcode 920 from the origin, stored in the measurement position designation section 1284. The image of the barcode 920 is formed in main and sub coordinate directions, and the barcode 920 is subjected to reading inspection with the first inspection means 907 and the second inspection means 908.

As described in the problem, when a customer makes a request of a printing company for production, how it is appropriate to designate a report target position, represented by quality report data, varies depending on the delivery form. In the present embodiment, the roll delivery sheet information 1273 or the cut sheet delivery sheet information 1274 is controlled to be selectively stored in PQX in accordance with setting information of the delivery form, stored in the delivery form designation section 1261 included in PRX shown in FIG. 12B. Even when the image forming apparatus used during production is the continuous form sheet image forming apparatus 103 or the cut sheet image forming apparatus 104, a customer is able to easily identify a part at which quality inspection is performed in a delivered product from PQX. Furthermore, even when produced in the continuous form sheet image forming apparatus 103 and subjected to cut sheet finishing in post-processing, a customer is able to easily identify a part at which quality inspection is performed in a delivered product from PQX.

Figure 13:
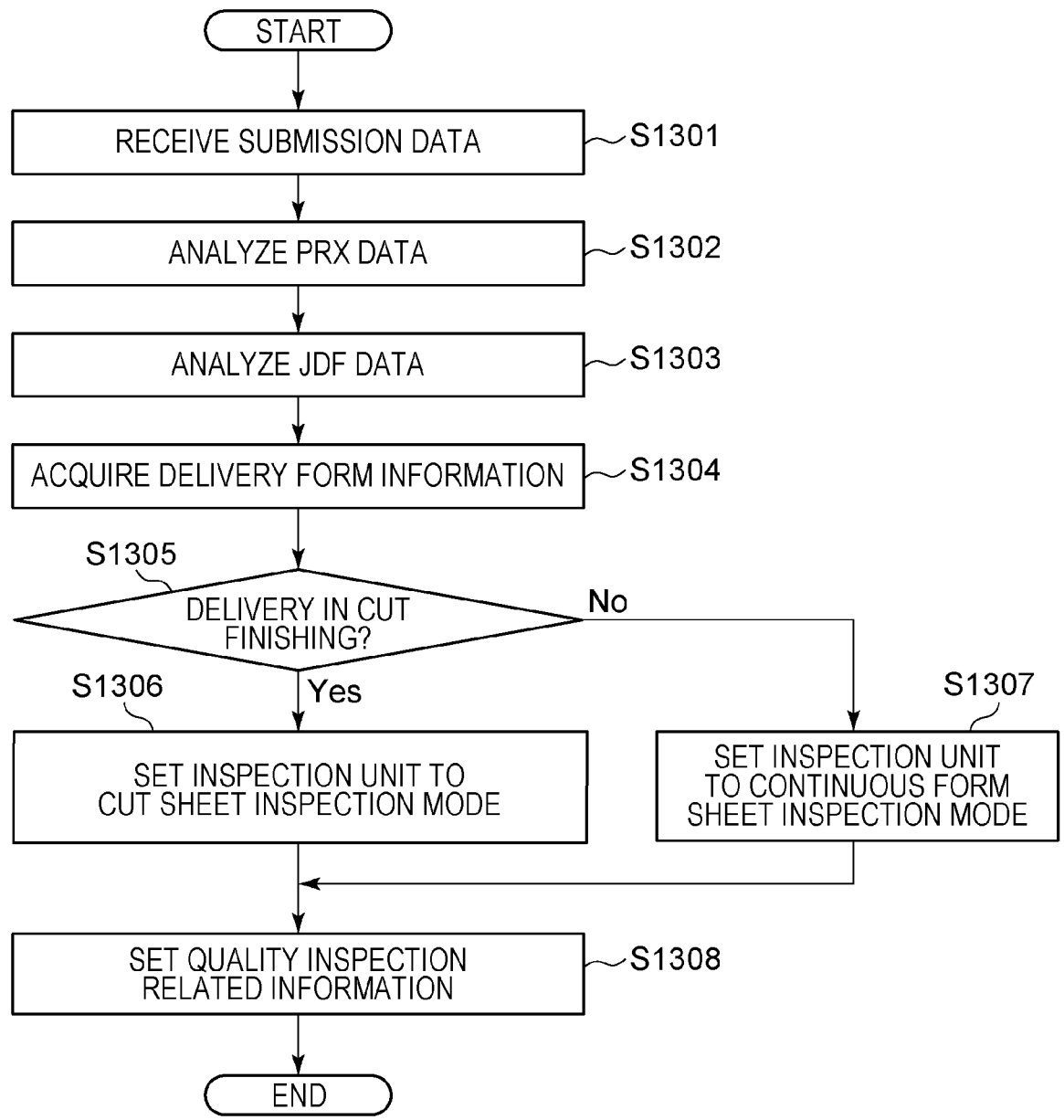
FIG. 13 is a first flowchart for illustrating the operation of a work flow control unit in the first embodiment.

FIG. 13 is a flowchart for illustrating a process in which the work flow control unit 707 analyzes PRX and designates the unit of designation of an inspection point in inspection for the inspection means of the image forming apparatus 103 or the image forming apparatus 104 in accordance with information on a delivery form. The operation shown in the flowchart is implemented by the CPU 301 running the work flow control program 505 stored in the HDD 311.

In S1301, the work flow control unit 707 receives submission data including PRX data, JDF data, and the like from the customer system 109 via the web server unit 705 and the submission system unit 706.

In S1302, a process of analyzing PRX data out of the data submitted in S1301 is executed. This corresponds to a process of analyzing PRX data described in XML format, shown in FIG. 12B, and various pieces of information on quality requirements concerned with creation of a product, designated by a customer for a printing company, are acquired. In S1303, a process of analyzing JDF data out of the data submitted in S1301 is executed. This corresponds to a process of analyzing JDF data described in XML format, shown in FIG. 12A, and various pieces of information on job execution conditions and setting information concerned with creation of a product, designated by the customer for the printing company, are acquired.

In S1304, instruction information on the delivery form of a product, designated by the customer for the printing company, is acquired from the information on the result of PRX analysis performed in S1302. This corresponds to a process of acquiring setting information of the delivery form designation section 1261 out of PRX data shown in FIG. 12B.

In S1305, the type of the delivery form is determined in accordance with the information acquired in S1304. When the delivery form acquired in S1304 indicates an instruction for cut finishing delivery, the process proceeds to S1306. In other words, when the designated delivery form is a cut sheet form, an instruction command to create cut sheet inspection quality information is transmitted to the inspection unit 214. In other words, an instruction is provided to the image forming apparatus (103, 104) to store a mode indicated by the inspection execution sheet information 1262, that is, information on the number of sheets from the beginning of a job, at the time when the inspection unit 214 creates an inspection result shown in FIG. 12C on a created product. Thus, the inspection unit 214 is set in a cut sheet inspection mode. In the step, a process of setting and transmitting a media size (1212, 1215, 1218) acquired as a result of analysis in S1303, the total number of copies printed 1203, information 1201 on the number of pages that make up a copy, and the lot 1287 is also executed at the same time.

As a result of determination of S1305, when an instruction for roll finishing delivery is determined from the delivery form acquired in S1304, the process proceeds to S1307. In other words, when the designated delivery form is roll finishing, an instruction command to create roll finishing inspection quality information is transmitted to the inspection unit 214. An instruction is provided to the image forming apparatus (103) to store a mode shown in the sheet inspection position designation section 1263, that is, information indicating the position a sheet from the leading edge of roll paper by length at the time when the inspection unit 214 creates an inspection result on a created product. Thus, the inspection unit 214 is set in a continuous form sheet inspection mode.

When the process of S1306 or S1307 ends, the process proceeds to S1308, and a process of setting, in the inspection unit 214, quality requirements information, set in PRX and designated by the customer for the printing company for production, is executed. Out of PRX information shown in FIG. 12B, inspection items set by the customer in the color quality information defining section 1229, the image misregistration quality information defining section 1241, and the barcode reading quality defining section 1250 are set in the inspection unit 214. An instruction to cause the inspection unit 214 to perform inspection on the above-described items during production is provided. A process of setting quality items required by customer for the printing company, that is, only quality requirements items included in PRX, to the inspection unit 214 is executed in the step. A process of transmitting, in the step, setting information in job ticket analyzed in S1303 is also executed in the step. The setting information in the job ticket also includes sheet size information and the like used during production.

Figure 14:
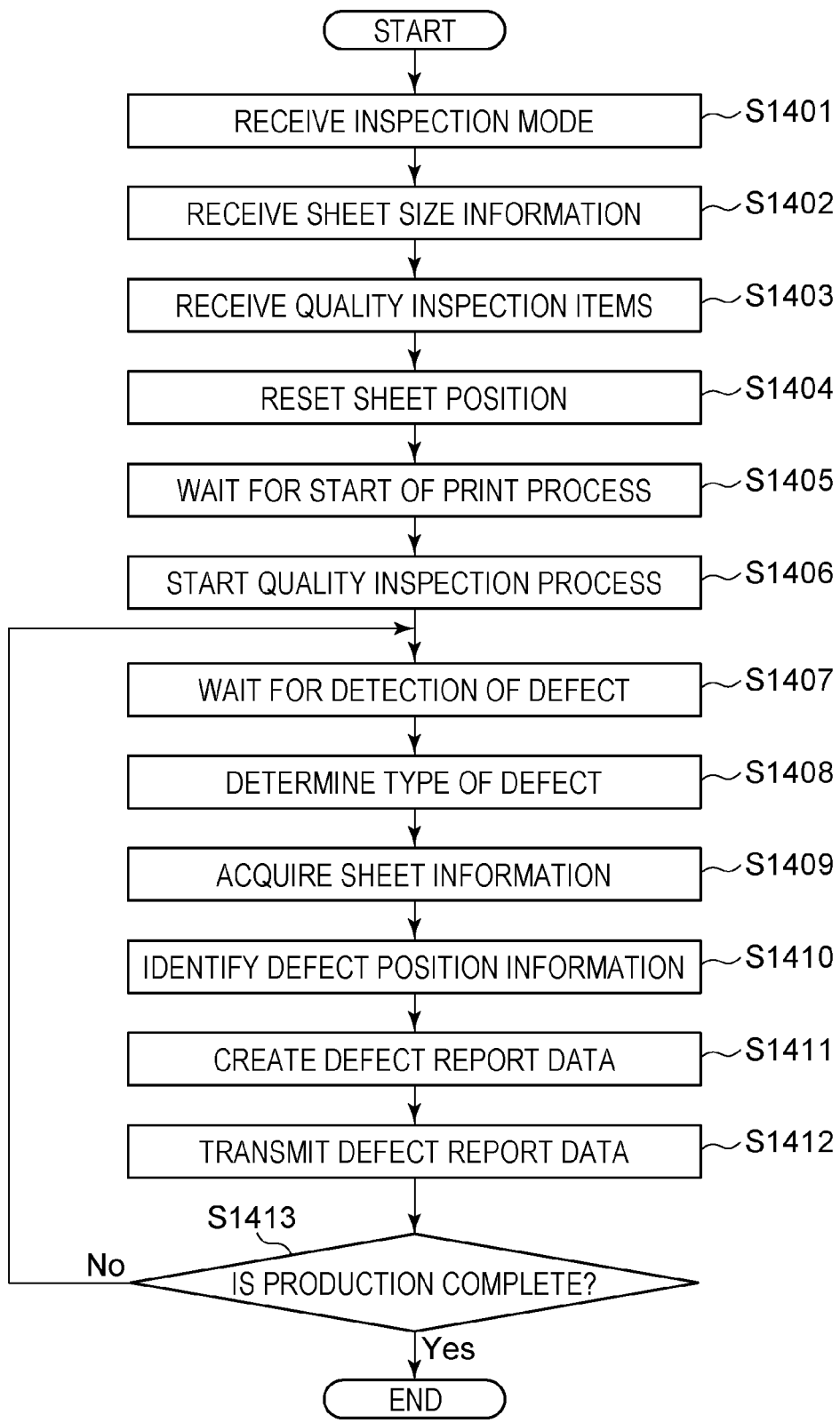
FIG. 14 is a flowchart for illustrating a process executed in an inspection unit of the image forming apparatus in the first embodiment.

FIG. 14 is a flow executed in the inspection unit 214 of the image forming apparatus 103 or the image forming apparatus 104. Specifically, creation and transmission of quality inspection information defined in PRX are performed in accordance with an instruction by the unit of designation of inspection point, shown in FIG. 13. The operation shown in the flowchart is implemented by the controller unit 205 running the sheet count program 409 and the inspection program 410 stored in the HDD 209.

In S1401, the information set in S1306 or S1307 in FIG. 13 is received. In other words, S1401 corresponds to a setting process for executing control such that inspection is performed in a mode of any one of the inspection execution sheet information 1262 and the sheet inspection position designation section 1263, shown in FIG. 12C, and the inspection result data shown in FIG. 12C is variably created according to a delivery form.

In S1402, the sheet size information set in job ticket, analyzed in S1303 and transmitted in S1308 in FIG. 13, is received. Subsequently, in S1403, quality inspection items set in PRX are received. The PRX information transmitted in S1308 described with reference to FIG. 13 corresponds to data species to be received in the step. In S1404, a process of resetting information indicating position information on a sheet of quality report information, detected by the inspection unit 214, is executed. In other words, in the case of the continuous sheet form image forming apparatus 103, position information is set to the leading edge position of roll paper. In other words, the length of defect position information on a sheet is set to zero. In the case of the cut sheet image forming apparatus 104, the accumulated number of sheets produced is set to zero as position information at the time of detecting a defect on a sheet produced by a job.

In the above steps, the image forming apparatus 103 or the image forming apparatus 104 completes preparations for being able to produce a product in a state of being able to perform quality inspection. In other words, the process remains in S1405 until a print job for producing a product is started in response to an instruction from the controller unit 205 of the image forming apparatus 103 or the image forming apparatus 104.

At the stage at which a print job for producing a product is started in response to an instruction from the controller unit 205, the process proceeds to S1406 and the following steps.

In S1406, a quality inspection process in the inspection unit 214 is executed. Specifically, the controller unit 205 controls the first to fourth inspection means (907, 908, 912, 913) that make up the inspection unit 214 shown in FIG. 9B in accordance with the inspection program 410 to execute a quality inspection process designated in PRX on image information formed on a sheet. In the process of the step, after the inspection program 410 starts the process, a steady quality monitoring state is maintained. In other words, in S1407, the process remains in the step until a quality defect concerned with quality requirements items designated in PRX is detected in the inspection unit 214.

When it is determined that the inspection unit 214 detects any defective state designated in PRX in image information formed on a sheet that is a produced product, the process proceeds to S1408, and the type of the detected defect and detailed information on the defect are determined. This corresponds to a process for acquiring or processing information required to generate inspection result data shown in FIG. 12C.

In S1409, information on a sheet from which a defect of image information formed on a detected product is acquired. Specifically, whether the delivery form designated by the customer or the printing company, received in S1401, is roll finishing or cut finishing is acquired.

In S1410, according to the information acquired in S1409, it is determined whether information on a defect position is provided in a mode of the inspection execution sheet information 1262 or a mode of the sheet inspection position designation section 1263 in FIG. 12C. The inspection program 410 acquires, from the inspection unit 214, or converts information on the defect position in the determined mode.

At the stage at which the process up to S1410 is complete, collection of an information set needed to generate inspection result data in the format shown in FIG. 12C from the information collected or created through the process in the flowchart completes. Therefore, the information set collected in S1411 is converted to the format shown in FIG. 12C, and inspection result data is transmitted to the work flow control program 505 as defect report data (S1412).

The operations shown in the steps from the above-described S1407 to S1412 are a series of processes continuously performed as long as production of a product continues. A determination for ending a loop process is S1413. In other words, it is determined whether the production process is complete. When the result of determination is negative, the process returns to S1407, and the above-described processes are repeatedly executed; whereas, when the determination result is affirmative, the process of the flow shown in the drawing ends.

FIG. 15 is a flow in which the work flow control unit 707 generates PQX information. Specifically, quality inspection information generated by the inspection program 410 shown in FIG. 14 is converted to PQX information. The operation shown in the flowchart is implemented by the CPU 301 running the work flow control program 505 stored in the HDD 311.

In S1501, execution of the flow shown in the drawing is started in response to the fact that inspection result data transmitted in S1412 shown in FIG. 14, that is, information in the format shown in FIG. 12C, is received.

A process of analyzing PRX data that is part of the submission data received in S1301 is executed in S1502, a process of analyzing JDF data that is part of the submission data received in S1301 is executed in S1503, and a process of acquiring delivery form information included in PRX is executed in S1504. However, it is conceivable that the work flow control program 505 holds and reuses the results of the analyzing processes executed in S1302, S1303, and S1304 shown in FIG. 13. In this case, the processes of S1502, S1503, and S1504 may be omitted.

In S1505, instruction information on the delivery form of a product, provided by the customer to the printing company, is determined in accordance with the information acquired in S1504. In other words, when it is determined that an instruction for cut finishing delivery is provided as the delivery form of a product, the process proceeds to S1506.

In S1506, the type of the image forming apparatus that has produced submission data transmitted by the customer to the printing company is determined. In other words, it is determined whether the image forming apparatus used during production is the cut sheet image forming apparatus 104. When the determination result is negative, this corresponds to the case where the image forming apparatus used during production is the continuous form sheet image forming apparatus 103. In other words, this corresponds to the case where, although the delivery form is cut finishing, the image forming apparatus used in production is not the cut sheet image forming apparatus 103. In this case, roll paper produced in the continuous form sheet image forming apparatus 103 needs to be processed into cut sheets and then delivered to the customer. However, at the time of reporting quality inspection with PQX to the customer, a production process is executed in a state of roll paper before being cut, and a quality inspection process is executed in the inspection unit 214. In other words, it is in a state where production is performed in a state different from the delivery form designated by the customer. Therefore, in this case, it is necessary to convert sheet information to information on a form different from the produced form, that is, the delivery form, and then report PQX to the customer. In other words, the process proceeds to S1507, and a process of converting the delivery form designation section 1261 that is information generated for continuous form sheets to the inspection execution sheet information 1262 intended for cut sheets.

The details of the conversion process in S1507 reference data and specific numeric values shown in FIGS. 12A to 12D and will be described in more details.

An example in the case where, at the time when the inspection unit 904 detects a defect, the numeric value of the sheet inspection position designation section 1263, received in S1501, is 7871.531 (meters) will be described below.

In the course to S1507, it is determined in S1505 that the delivery form is cut finishing delivery and in S1506 that a product is produced with a cut sheet machine. Therefore, it is necessary to convert in unit the numeric value 7871.5194 (meters) of the sheet inspection position designation section 1263 received in S1501 to information on the number of sheets in the step.

Specifically, in the job ticket shown in FIG. 12A, any of the media sizes (1212, 1215, 1218) used during production is 842, 1191 (in points). When converted to the metric system, 842*0.3527778/1000=0.297 m, 1191*0.3527778/1000=0.42 m, that is, A3 size.

Therefore, the accumulated number of sheets from the start of production can be obtained by dividing 7871.5194 m by 0.297 m that is the length of the short side of A3 sheet. In other words, a conversion process to 7871.5194/0.297=26500 (sheets), that is, the number of sheets (sheet number), that is, the 26500th sheet through sheet conversion, is executed in S1507.

The accumulated number of sheets is from the start of a job in the above example; however, conversion into the number of sheets from the leading edge of a lot in the step is, of course, possible. In other words, this corresponds to a process of converting the number of sheets from the leading edge of the third lot from position information in metric unit to information on the number of sheets as in the case of the above example.

The latter example will also be similarly described below by using specific numeric values.

An example of the case where the numeric value of the sheet inspection position designation section 1263, received in S1501, is 148.5194 (meters) in the third lot will be described below. When divided by 0.294 m that is the sheet size, 148.5194/0.297=500 is derived. In other words, a process of converting defect position information into the unit of sheet, meaning that a defect has occurred in the 500th sheet in the third lot, is executed in S1507.

When the process of S1507 ends, the determination result of S1505 is negative, and the determination result of S1506 is affirmative, the process proceeds to S1508.

In S1508, information on the defect position is set. Specifically, through the process from S1505 to S1507, information on the defect position is converted to the format of the roll delivery total sheet information 1270 or the cut sheet delivery total sheet information 1269 shown in FIG. 12D in accordance with the form of the defect position information according to the delivery form. Then, in accordance with the information created in S1508 and the information received in S1501, the defect information is converted to data in PQX format as shown in FIG. 12D in S1509, and the PQX data is stored in the web server unit 705.

Second Embodiment

In the first embodiment, the mechanism of switching designation of position information to be reported in a report of product quality reported in PQX according to a delivery form designated by a customer for a printing company in a printing company system and generating different PQX have been discussed. Hereinafter, an embodiment on a second designation method related to a switching process on a report position according to a delivery form in a customer and a printing company will be described.

In the second embodiment, a designation method of designating the position of product quality, different from that of the first embodiment, is a case of designation not in accordance with a delivery form but in accordance with the same mode. It will be necessary according to the reasons described below. In other words, this is a case in which, in a customer system or a printing company system, it is complicated to describe PQX in a different mode at the time of creating the PQX and it is desired to create PQX with a uniform mechanism. Since PQX is a uniform format, it is not always efficient for a customer or a printing company to make the mode of designation variable according to a production form or a delivery form described in the first embodiment. The second embodiment is made in view of such a situation.

FIG. 16 is a view showing an example of PQX generated in the second embodiment. PQX shown in the drawing is generated under the conditions described below. In other words, an example of the case where the delivery form is cut finishing but, different from the first embodiment, a method of designating the position of product quality is designated by the roll delivery total sheet information 1601 is described. Although the delivery form does not match the position designation method in report; however, the format of PQX always matches between a customer and a printing company, so it is a beneficial mode in terms of providing a uniform system.

Figure 17:
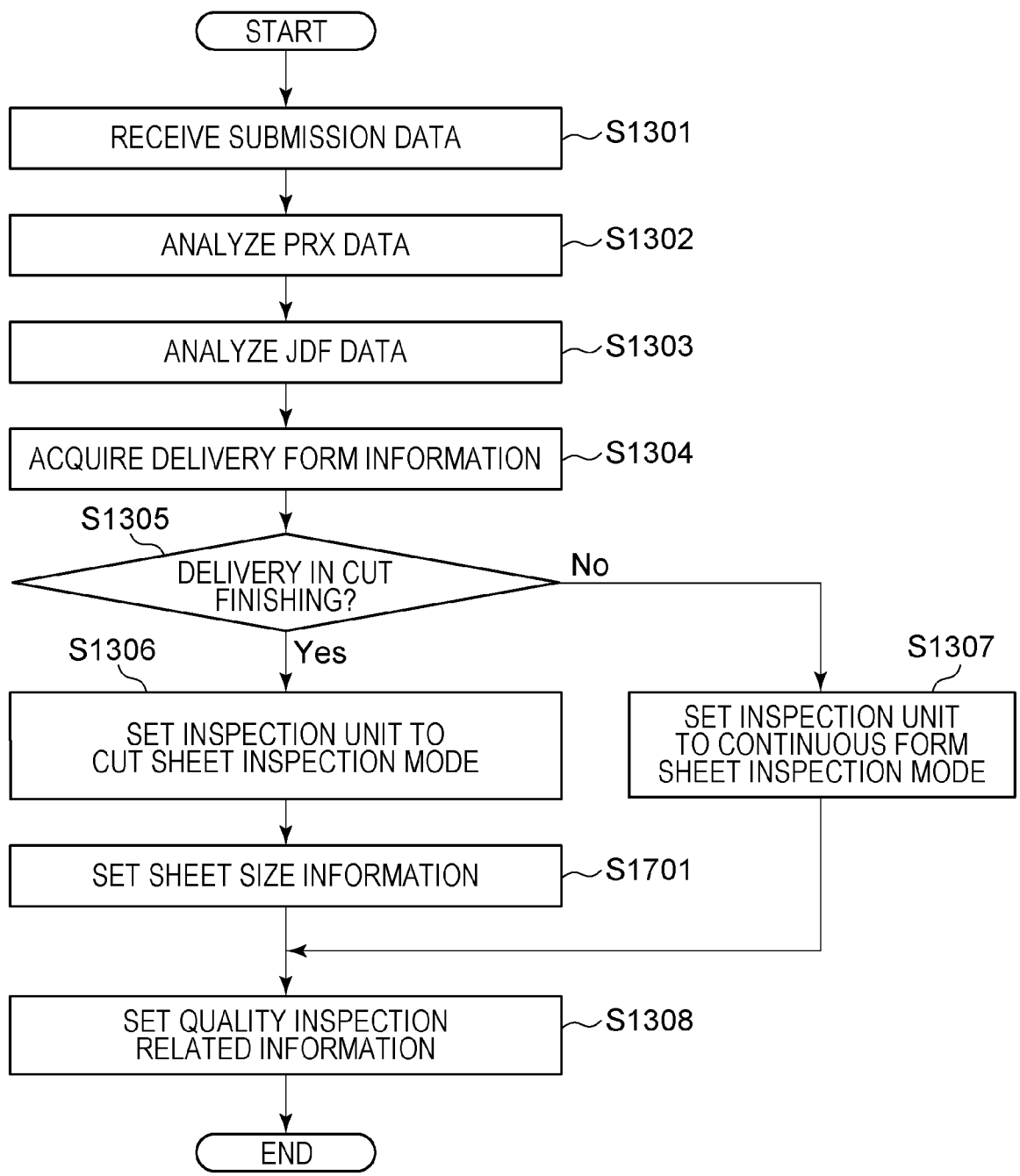
FIG. 17 is a first flowchart for illustrating the operation of a work flow control unit in the second embodiment.

FIG. 17 is a flowchart for illustrating a process in which the work flow control unit 707 analyzes PRX and designates the unit of designation of an inspection point in inspection for the inspection means to the image forming apparatus 103 or the image forming apparatus 104 in accordance with information on a delivery form in the second embodiment. The flowchart corresponds to FIG. 13 in the first embodiment. The difference from FIG. 13 in the first embodiment is S1701. This is a process after it is determined in S1305 that the delivery form of a product, designated by the customer for the printing company, is cut finishing. In S1306, an instruction command to create roll sheet inspection quality information is provided to the inspection unit 214 despite cut sheet finishing, and sheet size information of cut sheets is further set in S1701. This corresponds to setting information that the image forming apparatus 104 needs for generating information on the length from sheet size, that is, a sheet width in a conveyance direction and the accumulated number of sheets produced.

The details of the process in S1701 will be described in detail below by using specific numeric values and information shown in FIGS. 12A to 12D.

In S1305, it is determined that the delivery form is cut finishing delivery, and, in S1306, an instruction is provided to the inspection unit 904 to measure an inspection position as a continuous form sheet mode. In other words, an instruction is provided to the inspection unit 904 to measure an inspection position by length. However, as described above, since the actual finishing form is cut finishing, it is necessary to generate defect position information by general length in continuous form sheet finishing from the size information of cut sheets. Therefore, in S1701, information on the size of sheets used during production is set.

In the job ticket of FIG. 12A, any of the media sizes (1212, 1215, 1218) used during production is 842, 1191 (in points). When converted to the metric system, 842*0.3527778/1000=0.297 m, 1191*0.3527778/1000=0.42 m, that is, A3 size. Therefore, in S1701, sheet size information of the above-described A3 size of 0.297 m×0.42 m is set in the image forming apparatus.

Figure 18:
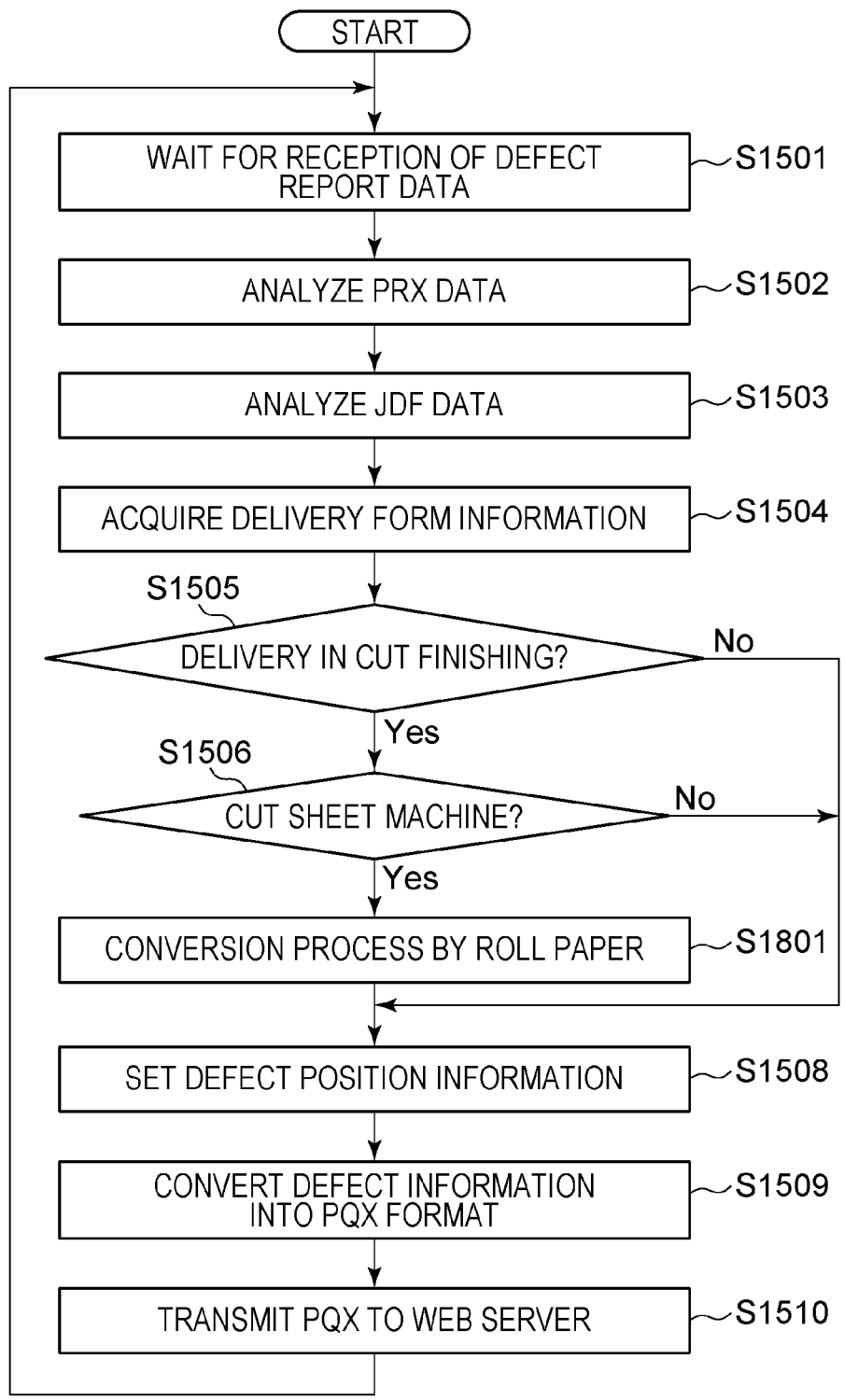
FIG. 18 is a second flowchart for illustrating the operation of the work flow control unit in the second embodiment.

FIG. 18 is a flow in which the work flow control unit 707 generates PQX information in the second embodiment. Specifically, quality inspection information generated by the inspection program 410 shown in FIG. 14 is converted to PQX information. The flow corresponds to the flow shown in FIG. 15 in the first embodiment. Hereinafter, S1801 that is a difference from FIG. 15 in the first embodiment will be described.

When it is determined in S1505 that the delivery form required of the printing company by the customer is cut finishing and it is determined in S1506 that the image forming apparatus used is a cut sheet machine, S1801 is executed. Since the delivery form is cut finishing and the image forming apparatus during production is a cut sheet machine, the unit of designation of position information of a quality inspection result to be stored in PQX is converted to length, that is, information equivalent to a distance from the leading edge of roll paper. After the work flow control unit 707 receives inspection information in a mode shown in FIG. 12C from the image forming apparatus, length information is generated by multiplying the length of a sheet in the conveying direction by the accumulated number of sheets produced is generated in S1801 and is converted into PQX format.

The details of the process in S1801 will be described in detail below by using information shown in FIGS. 12A to 12D and specific numeric values.

The sheet size information set in S1701 in FIG. 17 is 842, 1191 (in points). When converted to the metric system, 842*0.3527778/1000=0.297 m, 1191*0.3527778/1000=0.42 m, that is, A3 size. An example of the case where information on the number of sheets produced to that point in time, specifically, the value of the inspection execution sheet information 1262 of FIG. 12C, received in S1801, is 500 as shown in FIG. 12C, will be described.

The following information on the unit of length can be obtained by multiplying the sheet width 0.297 m in the sheet size information by the number of sheets, that is, 500, used during production and from which a defect is detected. 0.297*500=148.5 (m)

In other words, in the present embodiment, PQX in which the value of the roll delivery total sheet information 1270 reported by PQX is 148.5 is created and transmitted to the customer.

A further another example will be described.

The above-described example derives the roll delivery total sheet information 1270 from the leading edge of the third lot under the conditions shown in FIGS. 12A to 12D. Alternatively, a numeral can be derived in S1801 as accumulated defect position information from the start of production, that is, the leading edge of the first lot. In other words, for one lot, 13 A3-size sheets per copy and 1000 copies per lot are designation information of the job ticket shown in FIG. 12A. According to the conditions, the roll delivery total sheet information 1270 converted from the number of sheets per lot can be derived as follows. 0.297*13*1000=3861

In other words, as shown in FIG. 12C, when a defect occurs in the 500th sheet in the third lot and the defect position is converted to the roll delivery total sheet information 1270 in S1801, a numeral is derived as follows. 3861*2+148.5=7870.5 (m)

Third Embodiment

In the first embodiment, the case where, when the delivery form designated by a customer for a printing company is cut finishing, position information for quality report is designated in the mode of the cut sheet delivery total sheet information 1270 shown in FIG. 12D has been described.

However, it is estimated that, with an increase in the amount of production ordered, that is, the total number of sheets, the numeric value of the number of sheets stored in the cut sheet delivery total sheet information 1269 is huge. Particularly, when parts of commercial goods, such as packages, in the commercial printing field are produced, it is estimated to be an extremely long running job from the number of circulation of commercial goods, a commercial goods sales period, and the like. In such a mode, providing a quality report with the numeric value of the accumulated number of sheets from the beginning of a job in PQX information transmitted from a printing company to a customer is not easy for the customer to identify where report details are concerned in a product to be reported. The third embodiment is intended to provide a further means for resolving the above-described problem.

An example in which a customer designates the lot 1287 for a printing company with the job ticket shown in FIG. 12A and the unit of delivery is set has been described. The third embodiment in the present invention will be described below by using the example shown in the drawing.

FIG. 19A is an example of inspection result data generated at the time when the inspection unit 214 of the image forming apparatus 104 performs inspection on image information formed on a sheet that is a product in the case where production is performed in accordance with the job ticket shown in FIG. 12A. The inspection result data is generated at the time when inspection is performed by the inspection unit 214 at the 13001st sheet in the number of sheets and inspection of quality requirements items designated in PRX is performed. In other words, as shown in FIG. 12A, a product has 13 pages in the number of pages (1201) included in each copy and has 1000 copies in the lot 1287. In other words, production of lot 1 completes by 1000×13, that is, 13000 sheets in total. In other words, the 13001st sheet corresponds to the first sheet of lot 2. However, through the process shown in the flowchart (described later), at the stage at which the lot is changed, the count of a sheet inspection position designation section 1901 of inspection result data shown in FIG. 19A is reset. Then, the count of the sheet inspection position designation section 1901 is counted up again with the start of production of lot 2 (1902) that is a new lot.

FIG. 19B shows an example of PQX data generated in accordance with inspection result data shown in FIG. 19A. As shown in the drawing, PQX is generated such that the number of sheets included in the cut sheet delivery total sheet information 1903 is one and the number of lots is two.

Figure 20:
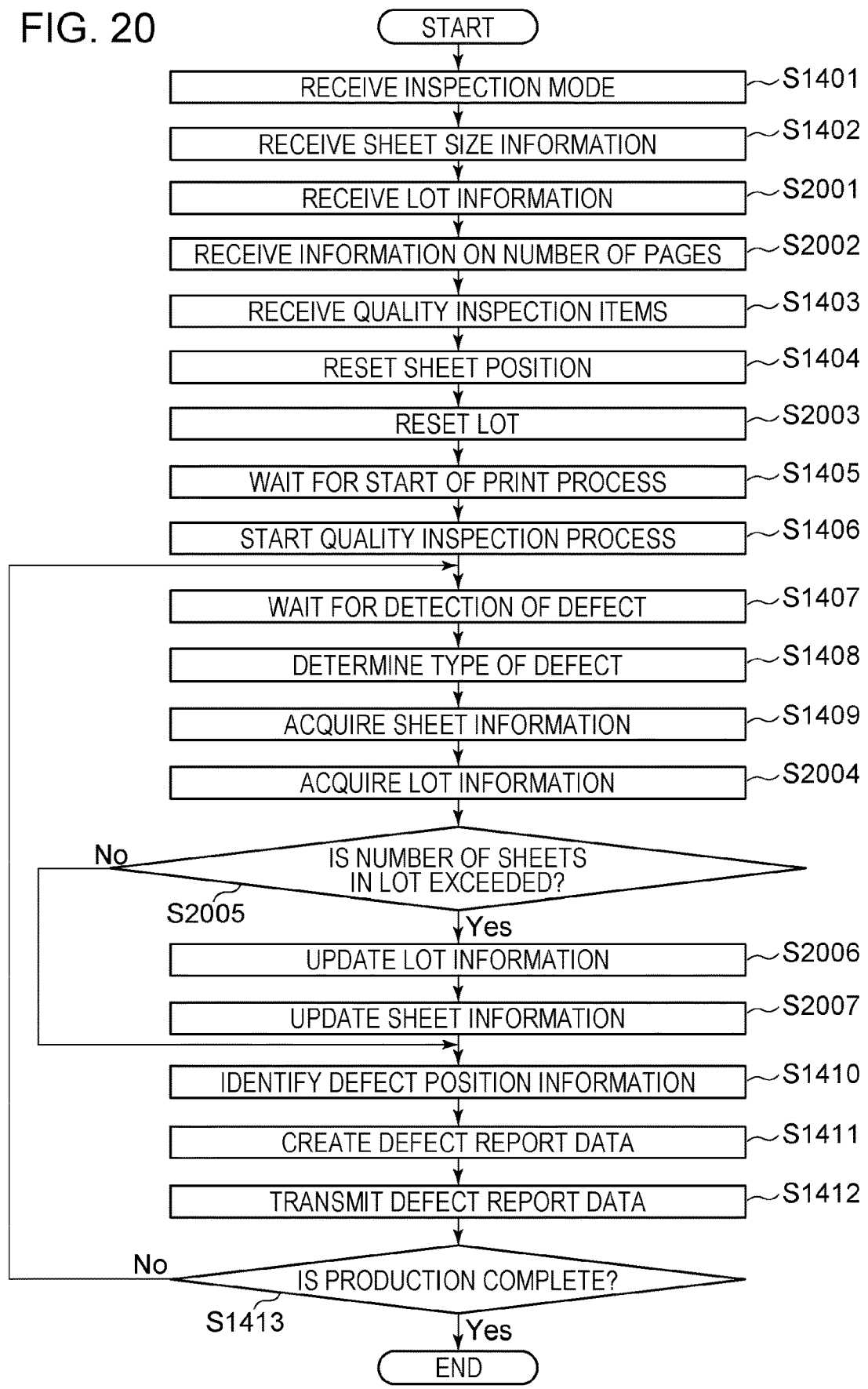
FIG. 20 is a flowchart for illustrating a process executed in an inspection unit of an image forming apparatus in the third embodiment.

FIG. 20 is a flow of a process of creating quality inspection information performed in the inspection unit 214 of the image forming apparatus 104 in the third embodiment. Specifically, quality inspection information defined in PRX is created in accordance with an instruction by the unit of designation of an inspection point, shown in FIG. 13. The operation shown in the flowchart is implemented by the controller unit 205 running the sheet count program 409 and the inspection program 410 stored in the HDD 209. The flow shown in the drawing corresponds to the process shown in FIG. 14 in the first embodiment. The difference from the operation of the flow shown in the first embodiment is that S2001 to S2007 are added.

In S2001, setting information on lot is received. This is to receive setting information of the lot 1287, transmitted in S1306 in FIG. 13. Similarly, in S2002, setting information on the number of pages in each copy is received. This is to receive the information on the number of pages 1201 that makes up each copy, transmitted in S1306 in FIG. 13.

Since the number of sheets consumed at the time of producing a product that makes up each copy is calculated from the sheet size information received in S1402 and the information on the number of pages, received in S2004, information corresponding to the accumulated length of sheets that make up each copy can be further obtained by calculation. Furthermore, it is possible to implement a process of detecting a change of lot from information on the number of copies that make up each lot, received in S2001, and resetting the count of sheet information included in PQX in response to the change of lot as shown in FIG. 14.

Before the start of a production process from S1406 in FIG. 20, the sheet position is reset (S1404), and the lot information is reset (S2003). Before the start of result printing, the sheet position information is set to zero, and the lot is set to one.

When a defect is detected as a result of inspection in the inspection unit 214 in S1407 of FIG. 20, the lot information is acquired in S2004. In S2005, it is determined whether the sheet position information acquired in S1409 exceeds the upper limit of sheets defined in each lot. Hereinafter, the details of the determination process in the step will be described in details by using a further specific example.

It is assumed that the last quality report information, that is, sheet information and lot information at the time of transmission of PQX, are as follows.

Lot: 1, and Sheet information: 10000 (sheets)

It is also assumed that sheet information and lot information when detected in S1407 are as follows.

Lot: 1, and Sheet information: 20000 (sheets)

On the other hand, as described with reference to FIG. 14, in the example used in the description in the present embodiment, the number of pages, that is, the number of sheets, that make up each lot of a product is 13000. In other words, in the above-described example, the position of the sheet, at which the inspection unit 214 has detected a defect, detected in S1407, is not in lot 1 but in lot 2 that is the next lot. Therefore, the result of determination of S2005 is affirmative, so the process proceeds to S2006 and the following steps.

It is also assumed that sheet information and lot information when detected in S1407 are as follows.

Lot: 1, and Sheet information: 11000 (sheets)

In this case, when the number of sheets produced as a difference from the last time point at which a defect is detected is added together as well, the number of sheets is 11000 sheets. In other words, in the case of the latter example, a defect is detected in lot 1. Therefore, in this case, the result of determination of S2005 is negative, and the process proceeds to S1410 and the following steps.

In S2006, as a result of the determination of S2005, lot information included in PQX is updated, and, furthermore, page information included in PQX is also similarly corrected to the number of sheets in the updated lot in S2007.

In the present embodiment, an example of the case in which a process of resetting lot information is executed in response to detection of a defect is described; however, it may be implemented with another method. For example, there is a technique for incrementing at the timing at which an image forming apparatus feeds or discharges a sheet used during production or the sheet passes through the inspection unit 214 and, for example, incorporating the incremented numeric value in quality report data at the time when a report resulting from inspection is needed. In this case, a production target lot number is updated at the stage at which production of sheets that make up each lot completes, that is, at every 13000 sheets in the above-described example. With any technique, generated PQX can be similarly configured, that is, the generated PQX can provide an equivalent benefit.

OTHER EMBODIMENTS

The present invention can be implemented by processing of supplying a program for implementing one or more functions of the above-described embodiments to a system or apparatus via a network or storage medium, and causing one or more processors in the computer of the system or apparatus to read out and execute the program.

Alternatively, embodiments of the present invention may be implemented by a circuit (for example, ASIC) that implements one or more functions.

Preferred embodiments of the present invention are described in detail above; however, the present invention is not limited to those specific embodiments. Various modifications and changes are possible within the scope of the present invention described in the appended claims.

According to the above-described embodiments, when a customer makes a request of a printing company for production, it is possible to provide a means of switching a report form of product quality to an appropriate means in accordance with a delivery form of the product. Specifically, in the case of delivery in a roll form, a point at which inspection is performed is designated by a distance from the leading edge of a sheet; whereas, in the case of cut sheet finishing, a point at which inspection is performed is designated by the number of sheets from the start of production of sheets. Thus, the customer is able to further easily recognize a part of a product to be inspected from report information on the quality of the product according to a delivery form.

Furthermore, it is possible to variably create position information in a product, to which report information corresponds, at the time of creating quality report information in accordance with the delivery form of a product, designated by a customer for a printing company.

According to the above-described embodiments, it is beneficial for a customer to easily check a position at which quality inspection is performed in a quality report on a product in accordance with a delivery form.

Embodiments of the present invention are not limited to the above-described embodiments. Various changes or modifications are applicable without departing from the spirit and scope of the present invention. Therefore, the following claims are attached to show the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An information processing apparatus comprising:
at least one processor; and
at least a memory coupled to the at least one processor and having instructions stored thereon, wherein the instructions, when executed by the at least one processor, cause the information processing apparatus to:
perform quality inspection on a print product;
acquire delivery form information on the print product; and
generate position information indicating a position of the quality inspection in accordance with the acquired delivery form information and generate quality report data including the position information.

2. The information processing apparatus according to claim 1, wherein the delivery form information is information indicating any one of a rolled form and a cut sheet form.

3. The information processing apparatus according to claim 2, wherein, when the delivery form information is information indicating a rolled form, the position information indicating a position of the quality inspection is indicated by a position from a leading edge of roll paper.

4. The information processing apparatus according to claim 2, wherein, when the delivery form information is information indicating a cut sheet form, the position information indicating a position of the quality inspection is indicated by a sheet number.

5. The information processing apparatus according to claim 1, wherein the instructions, when executed by the at least one processor, further cause the information processing apparatus to receive quality requirements data on the print product,
wherein the delivery form information on the print product is acquired from the quality requirements data.

6. The information processing apparatus according to claim 1, wherein the information processing apparatus is an image forming apparatus.

7. A control method for an information processing apparatus, the control method comprising:
performing quality inspection on a print product;
acquiring delivery form information on the print product; and
generating position information indicating a position of the quality inspection in accordance with the acquired delivery form information and generating quality report data including the position information.

8. The control method for an information processing apparatus according to claim 7, wherein the delivery form information is information indicating any one of a rolled form and a cut sheet form.

9. The control method for an information processing apparatus according to claim 8, wherein, when the delivery form information is information indicating a rolled form, the position information indicating a position of the quality inspection is indicated by a position from a leading edge of roll paper.

10. The control method for an information processing apparatus according to claim 8, wherein, when the delivery form information is information indicating a cut sheet form, the position information indicating a position of the quality inspection is indicated by a sheet number.

11. The control method for an information processing apparatus according to claim 7, further comprising receiving quality requirements data on the print product,
wherein the acquiring acquires the delivery form information on the print product from the quality requirements data.

12. A non-transitory computer-readable medium storing a program, the program including instructions, which when executed by one or more processors of an information processing apparatus, cause the information processing apparatus to:
perform quality inspection on a print product;
acquire delivery form information on the print product; and
generate position information indicating a position of the quality inspection in accordance with the acquired delivery form information and generate quality report data including the position information.

* * * * *